US011370358B2

(12) United States Patent
Lee et al.

(10) Patent No.: US 11,370,358 B2
(45) Date of Patent: Jun. 28, 2022

(54) CLOAKING DEVICES WITH TILT CORRECTION AND VEHICLES COMPRISING THE SAME

(71) Applicant: Toyota Motor Engineering & Manufacturing North America, Inc., Plano, TX (US)

(72) Inventors: Kyu-Tae Lee, Ann Arbor, MI (US); Songtao Wu, Ann Arbor, MI (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1008 days.

(21) Appl. No.: 15/959,789

(22) Filed: Apr. 23, 2018

(65) Prior Publication Data

US 2019/0322218 A1 Oct. 24, 2019

(51) Int. Cl.
| | |
|---|---|
| *B60R 1/00* | (2022.01) |
| *G02B 27/12* | (2006.01) |
| *G02B 17/02* | (2006.01) |
| *G02B 17/08* | (2006.01) |
| *G02B 17/00* | (2006.01) |
| *G02B 3/08* | (2006.01) |
| *G02B 5/04* | (2006.01) |

(52) U.S. Cl.
CPC ............ *B60R 1/007* (2013.01); *G02B 17/008* (2013.01); *G02B 17/023* (2013.01);
(Continued)

(58) Field of Classification Search
CPC .. B60R 1/00; B60R 1/007; B60R 1/08; B60R 1/081; B60R 1/082; B60R 1/10;
(Continued)

(56) References Cited

U.S. PATENT DOCUMENTS

| | | | | |
|---|---|---|---|---|
| 3,972,584 | A | * 8/1976 | Lobb | ...................... G02B 17/08 359/433 |
| 9,405,118 | B1 | * 8/2016 | Lu | ...................... G02B 17/0844 |

(Continued)

FOREIGN PATENT DOCUMENTS

TW 201715272 A 5/2017

OTHER PUBLICATIONS

U.S. Appl. No. 15/423,149, filed Feb. 2, 2017; Inventors: Debasish Banerjee et al.

(Continued)

*Primary Examiner* — Nicholas R. Pasko
(74) *Attorney, Agent, or Firm* — Dinsmore & Shohl LLP

(57) ABSTRACT

A cloaking device comprises an object-side, an image-side, a cloaked region between the object-side and the image-side. An object-side optical component and an object-side tilt correction (TC) component are positioned on the object-side, and an image-side optical component and an image-side TC component are positioned on the image-side. The cloaking device is tilted relative to an object positioned on the object-side such that light from the object is incident on the cloaking device at an acute angle. The object-side TC component redirects light from the object incident on the cloaking device such that the light propagates through the cloaking device generally normal to the object-side and image-side optical components. The image-side TC component redirects light propagating through the cloaking device back to normal to the object to form an image of the object on the image-side of the cloaking device which, if not for the TC components, would be distorted.

13 Claims, 14 Drawing Sheets

(52) U.S. Cl.
CPC ........... *G02B 17/026* (2013.01); *G02B 17/08* (2013.01); *G02B 17/086* (2013.01); *G02B 27/126* (2013.01); *G02B 3/08* (2013.01); *G02B 5/04* (2013.01); *G02B 5/045* (2013.01)

(58) Field of Classification Search
CPC .................. B60R 13/02; B60R 13/025; B60R 2013/0287; B60R 2300/202; B62D 25/04; G02B 2003/0093; G02B 2207/123; G02B 23/02; G02B 27/00; G02B 27/0972; G02B 27/1086; G02B 27/126; G02B 27/14; G02B 27/141; G02B 27/144; G02B 27/145; G02B 27/146; G02B 27/283; G02B 3/0006; G02B 3/0043; G02B 3/0056; G02B 3/06; G02B 3/08; G02B 5/04; G02B 5/045; G02B 5/08; G02B 5/09; G02B 5/1876; G02B 5/20; G02B 5/26; G02B 5/30; G02B 17/006; G02B 17/008; G02B 17/02; G02B 17/023; G02B 17/04; G02B 17/06; G02B 17/0615; G02B 17/0621; G02B 17/0642; G02B 17/0647; G02B 17/08; G02B 17/026; G02B 17/086; G02B 23/08
USPC ....... 359/618, 629, 642, 741, 742, 831, 837, 359/838, 839, 850, 854, 855, 856, 857, 359/860, 861
See application file for complete search history.

(56) References Cited

U.S. PATENT DOCUMENTS

| 9,557,547 | B2* | 1/2017 | Choi ..................... G02B 17/08 |
| 2015/0183375 | A1* | 7/2015 | Wu ....................... G02B 23/08 |
| | | | 359/734 |
| 2015/0234100 | A1* | 8/2015 | Lu ..................... G02B 27/0938 |
| | | | 359/850 |
| 2015/0248013 | A1* | 9/2015 | Chen ...................... G21K 1/06 |
| | | | 359/625 |
| 2017/0227781 | A1 | 8/2017 | Banerjee et al. |
| 2017/0276458 | A1 | 9/2017 | Scarbrough et al. |

OTHER PUBLICATIONS

U.S. Appl. No. 15/423,170, filed Feb. 2, 2017; Inventors: Mayu Takagi et al.
U.S. Appl. No. 15/435,996, filed Feb. 17, 2017; Inventors: Debasish Banerjee et al.
U.S. Appl. No. 15/660,007, filed Jul. 26, 2017; Inventors: Kyu-Tae Lee et al.
U.S. Appl. No. 15/668,217, filed Aug. 3, 2017; Inventors: Kyu-Tae Lee et al.
U.S. Appl. No. 15/677,341, filed Aug. 15, 2017; Inventors: Kyu-Tae Lee et al.
U.S. Appl. No. 15/700,740, filed Sep. 11, 2017; Inventors: Kyu-Tae Lee et al.
U.S. Appl. No. 15/704,803, filed Sep. 14, 2017; Inventors: Kyu-Tae Lee et al.
U.S. Appl. No. 15/813,817, filed Nov. 15, 2017; Inventors: Kyu-Tae Lee et al.
U.S. Appl. No. 15/813,830, filed Nov. 15, 2017; Inventors: Kyu-Tae Lee et al.
U.S. Appl. No. 15/813,845, filed Nov. 15, 2017; Inventors: Kyu-Tae Lee et al.
U.S. Appl. No. 15/816,084, filed Nov. 17, 2017; Inventors: Kyu-Tae Lee et al.
U.S. Appl. No. 15/863,353, filed Jan. 5, 2018; Inventors: Chengang Ji et al.
U.S. Appl. No. 15/883,875, filed Jan. 30, 2018; Inventors: Chengang Ji et al.

* cited by examiner

CLOAKING DEVICES WITH TILT CORRECTION AND VEHICLES COMPRISING THE SAME

TECHNICAL FIELD

The present specification generally relates to apparatuses and methods for making an object appear transparent and, more specifically, to apparatuses and methods with tilt correction for making pillars of vehicles appear transparent.

BACKGROUND

Studies on cloaking devices that appear to make a pillar of a vehicle transparent such that objects positioned outside the vehicle can be seen "through" the pillar have been published. Such studies disclose light propagating generally normal to surfaces of the cloak devices. However, cloaking devices oriented at an acute or obtuse angle relative to objects outside the vehicle may provide a distorted image of the objects.

Accordingly, a need exists for tilt correction for cloaking devices oriented at an acute or obtuse angle relative to objects outside a vehicle.

SUMMARY

In one embodiment, a cloaking device comprises an object-side, an image-side, a cloaked region between the object-side and the image-side, a zero-tilt axis and a tilt axis. The zero-tilt axis extends generally parallel to an object positioned on the object-side and the tilt axis extends at an acute angle relative to the zero-tilt axis. In some embodiments, the zero-tilt axis may be a vertical axis. An object-side optical component is positioned on the object-side and an image-side optical component is positioned on the image-side. The object-side optical component and the image-side optical component are oriented generally parallel to the tilt axis thereby being tilted (i.e., inclined) relative to the zero-tilt axis at the acute angle. An object-side tilt correction (TC) component is positioned on the object-side and an image-side TC component is positioned on the image-side. Light from an object on the object-side of the cloaking device propagating normal to the zero-tilt axis and incident on the object-side TC component is redirected generally normal to the tilt axis by the object-side TC component such that the light from the object propagates through the object-side optical component and the image-side optical component generally normal to the tilt axis. Light propagating through the image-side optical component generally normal to the tilt axis is redirected generally normal to the zero-tilt axis by the image-side TC component to form an image of the object on the image-side of the cloaking device such that the light from the object appears to pass through the CR. In some embodiments, the object-side TC component may be positioned outwardly from the object-side optical component and the image-side TC component may be positioned outwardly from the image-side optical component. In embodiments, light propagates through the cloaking device via an optical path of: object—object-side TC component—object-side optical component—image-side optical component—image-side TC component—image.

In some embodiments, the object-side TC component and the image-side TC component each comprise at least one Fresnel prism. In such embodiments, the at least one Fresnel prism of the object-side optical component refracts light from the object on the object-side of the cloaking device incident on the object-side TC component generally normal to the tilt axis. The light refracted by the object-side TC component propagates through the object-side optical component and the image-side optical component generally normal to the tilt axis. The at least one Fresnel prism of the image-side optical component refracts light propagating through the image-side optical component generally normal to the zero-tilt axis to form the image of the object on the image-side of the cloaking device such that the light from the object appears to pass through the CR. The at least one Fresnel prism of the object-side TC component and the image-side TC component may each comprise an outward facing first surface and an inward facing hypotenuse surface and light may propagate through the cloaking device via an optical path of: object—outward facing first surface of object-side TC component—inward facing hypotenuse surface of object-side TC component—object-side optical component—image-side optical component—inward facing hypotenuse surface of image-side TC component—outward facing first surface of image-side TC component—image.

In embodiments, the object-side optical component and the image-side optical component may comprise at least one of a pair of prisms, a pair of planar mirrors, a pair of curved mirrors, a pair of half-mirrors, a pair of converging lenses and a pair of color filters.

In another embodiment, a cloaking device assembly comprises an object-side, an image-side, a cloaked region between the object-side and the image-side, and a cloaked article positioned within the cloaked region. A zero-tilt axis and a tilt axis may be included and the zero-tilt axis may extend generally parallel to an object positioned on the object-side and the tilt axis may extend at an acute angle relative to the zero-tilt axis. An object-side optical component and an object-side tilt correction (TC) component are positioned on the object-side of the cloaked region and tilted relative to the zero-tilt axis at an acute angle. An image-side optical component and an image-side TC component are positioned on the image-side of the cloaked region and tilted relative to the zero-tilt axis at the acute angle. The object-side TC component may be positioned outwardly from the object-side optical component and the image-side TC component may be positioned outwardly from the image-side optical component. Light from an object on the object-side of the cloaking device assembly propagating at an acute angle relative to the tilt axis and incident on the object-side TC component is redirected by the object-side TC component such that the light propagates through the object-side optical component and the image-side optical component generally normal to the tilt axis. Also, light propagating through the image-side optical component generally normal to the tilt axis is redirected by the image-side TC component generally normal to the zero-axis to form an image of the object on the image-side of the cloaking device such that the light from the object appears to pass through the CR.

In embodiments, the object-side TC component and the image-side TC component may each comprise at least one Fresnel prism. In such embodiments, the at least one Fresnel prism of the object-side optical component refracts light from the object incident on the cloaking device generally normal to the tilt axis, and the at least one Fresnel prism of the image-side optical component refracts light propagating through the image-side optical component generally normal to the zero-tilt axis. In some embodiments, the at least one Fresnel prism of the object-side TC component and the at least one Fresnel prism of the image-side TC component may each comprise an outward facing first surface and an inward facing hypotenuse surface. In such embodiments, light propagates through the cloaking device via an optical path of: object—outward facing first surface of object-side TC component—inward facing hypotenuse surface of object-side TC component—object-side optical component—image-side optical component—inward facing hypotenuse surface of image-side TC component—outward facing first surface of image-side TC component—image.

In still another embodiment, a vehicle comprises an A-pillar and a cloaking device positioned on the A-pillar. The cloaking device comprises an object-side, an image-side, a cloaked region, a zero-tilt axis and a tilt axis. The zero-tilt axis extends generally parallel to an object that may be positioned on the object-side and the tilt axis extends at an acute angle relative to the zero-tilt axis. The A-pillar is positioned within the cloaked region and extends generally parallel to the tilt axis. The object-side is positioned on an exterior of the vehicle and the image-side is positioned within an interior of the vehicle. An object-side optical component is positioned on the object-side and an image-side optical component is positioned on the image-side. An outward facing surface of the object-side optical component and an outward facing surface of the image-side optical component are oriented generally parallel to the tilt axis such that the object-side optical component and the image-side optical component are tilted at the acute angle relative to the zero-tilt axis. An object-side tilt correction (TC) component is positioned on the object-side and an image-side TC component is positioned on the image-side. Light from an object on the object-side that is incident on the cloaking device and propagating normal to the zero-tilt axis is redirected generally normal to the tilt axis by the object-side TC component. The light redirected by the object-side TC component propagates through the object-side optical component and the image-side optical component generally normal to the tilt axis. Also, light propagating through the image-side optical component is redirected generally parallel to the light from the object incident on the cloaking device by the image-side TC component to form an image of the object on the image-side of the cloaking device, which if not for the object-side TC component and the image-side TC component, would be distorted due to the tilting of the cloaking device relative to the object.

In some embodiments, the object-side TC component is positioned outwardly from the object-side optical component, the image-side TC component is positioned outwardly from the image-side optical component, and the object-side TC component and the image-side TC component may each comprise at least one Fresnel prism. In such embodiments, the at least one Fresnel prism of the object-side TC component refracts light from the object incident on the cloaking device generally normal to the tilt axis. Also, the at least one Fresnel prism of the image-side TC component refracts light propagating through the image-side optical component generally normal to the zero-tilt axis to form an image of the object on the image-side of the cloaking device, which if not for the object-side TC component and the image-side TC component, would be distorted due to the tilting of the cloaking device relative to the object.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device with tilt correction (TC) may generally comprise a cloaked region, an object-side optical component and an object-side TC component positioned on an object-side of the cloaked region, and an image-side optical component and an image-side TC component positioned on an image-side of the cloaked region. The cloaking devices with tilt correction described herein may utilize lenses, prisms, mirrors, half-mirrors and/or color filters to "bend" and refract light from an object on an object-side of a tilted cloaking device around the cloaked region to form an image of the object on an image-side of the cloaking device which, if not for the object-side TC component and the image-side TC component, would be distorted due to the tilt of the cloaking device relative to the object. Cloaking devices may be used to cloak vehicle articles such as vehicle A-pillars, B-pillars, C-pillars, D-pillars, etc., and remove a "blind spot" caused by the vehicle article. A blind spot refers to a region of the vehicle where an occupant's view may be obstructed. The utilization of the optical-side TC component and the image-side TC component allow a driver to perceive an image which, if not for the TC components, would be distorted due to the tilt of the cloaking device. Various embodiments of cloaking devices with TC components and methods for using the same will be described in further detail herein with specific reference to the appended drawings.

Figure 1:
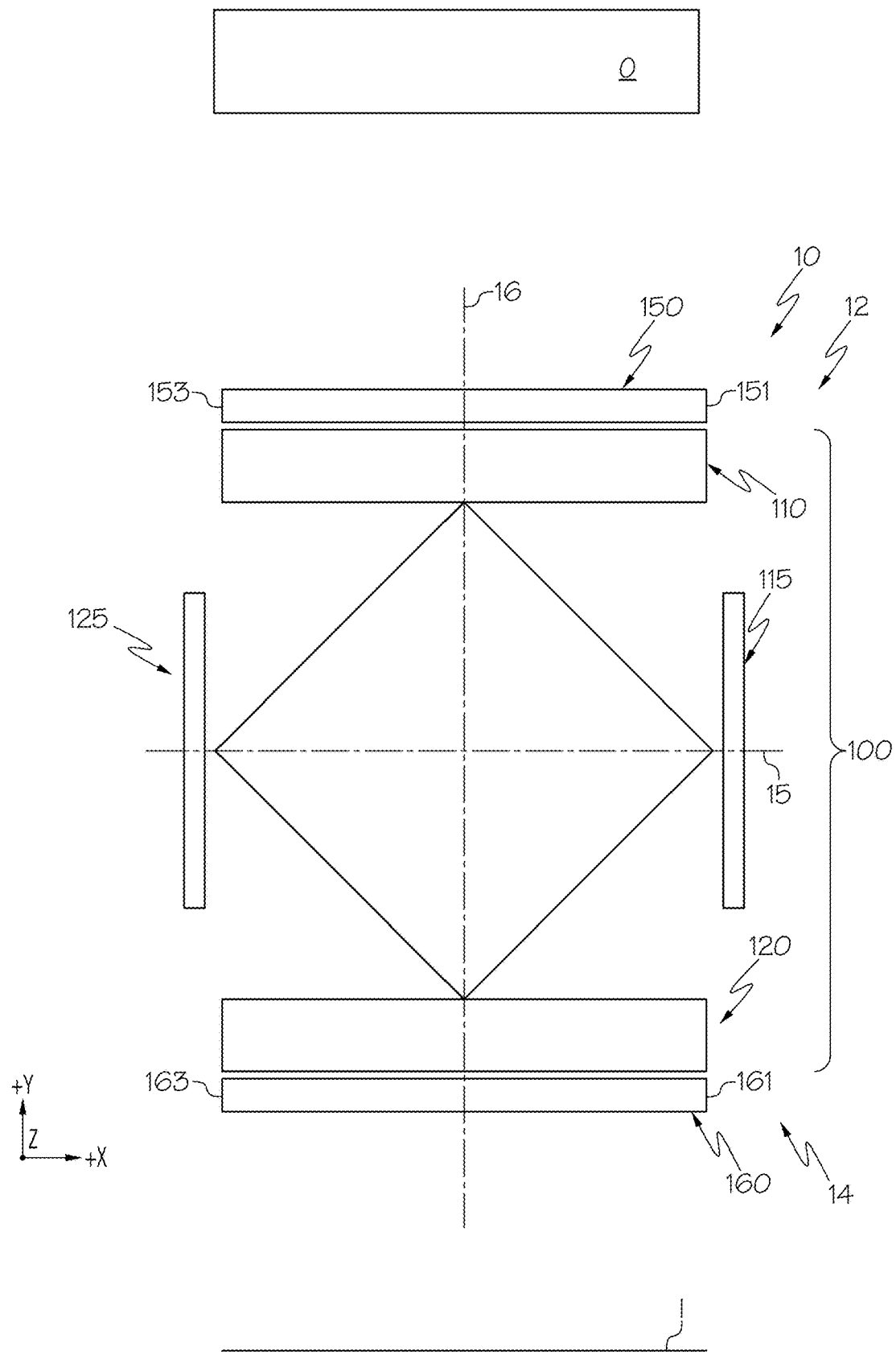
FIG. 1 schematically depicts a top view of a cloaking device with tilt correction according to one or more embodiments disclosed and described herein.

FIG. 1 generally depicts one embodiment of a cloaking device with tilt correction. In some embodiments, a zero-tilt axis extends non-parallel to one or more outward facing surfaces of the cloaking device and a tilt axis extends generally parallel to one or more surfaces of the cloaking device. Accordingly, cloaking devices described herein aligned generally parallel with the tilt axis are aligned non-parallel to the zero-tilt axis and thereby are "tilted" (i.e., inclined). In some embodiments, an object positioned on the object-side of a cloaking device may be aligned generally parallel to the zero-tilt axis and the cloaking device is aligned non-parallel to the zero-tilt axis. In such embodiments, the cloaking device is tilted relative to the object. The phrase "zero-tilt axis" as used herein refers to an axis extending non-parallel to one or more surfaces (e.g., one or more outward facing surfaces) of the cloaking device and the term 'tilt axis" refers to an axis lying in the same plane as the zero-tilt axis, extending generally parallel to one or more surfaces of the cloaking device, and oriented at an acute angle relative to the zero-tilt axis. As used herein, the term "tilt" refers to a non-zero angle between a zero-tilt axis of a cloaking device and a tilt axis of the cloaking device, and the phrase "tilt correction" refers to correction of an image on an image-side of a cloaking device which, if not for TC components, would be distorted due to light propagating through the cloaking device at an acute angle relative to the zero-tilt axis of the cloaking device. As used herein, the phrase "outward facing surface" refers to a surface facing away or distal from a cloaked region of a cloaking device and the phrase "inward facing surface" refers to a surface facing towards or proximal to the cloaked region.

Figure 4:
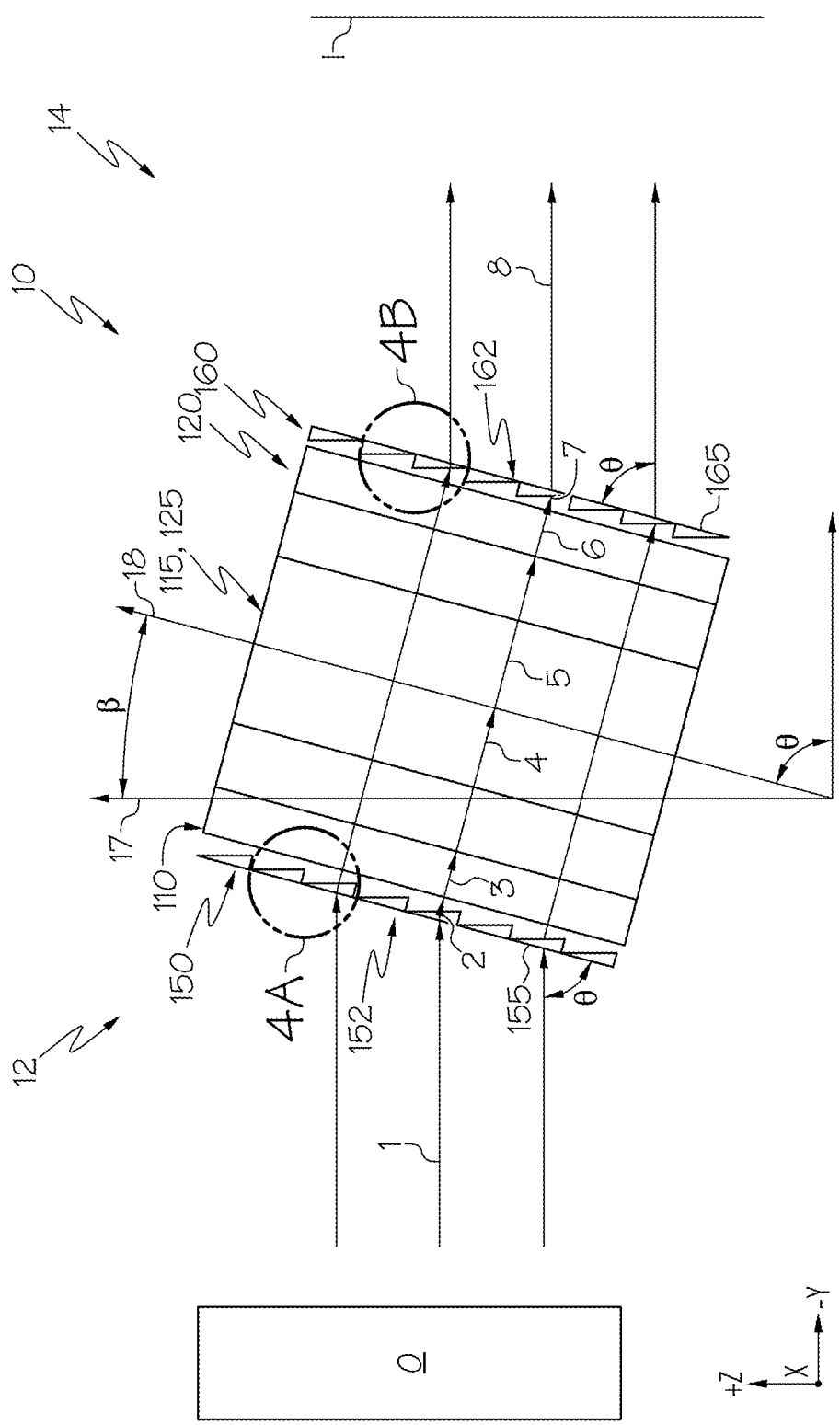
FIG. 4 schematically depicts a side view of the cloaking device with tilt correction of FIG. 3.

The cloaking device includes a cloaked region at least partially bounded by an object-side optical component and an image-side optical component. An object-side TC component may be positioned outwardly from the object-side optical component and an image-side TC component may be positioned outwardly from the image-side optical component. As used herein, the phrase "positioned outwardly" refers to a component positioned distal to a cloaked region of a cloaking device relative to another component positioned proximal to the cloaked region. The cloaking device may be tilted at an angle 'β' relative to an object positioned on an object-side of the cloaking device (FIG. 4) such that light from the object is incident on the object-side TC component at an acute angle 'θ' (FIG. 4). The light incident on the object-side TC component at the acute angle θ is redirected by the object-side TC component such that the light propagates through the cloaking device generally normal to the object-side and image-side optical components. As used herein, the term "redirected" refers to refracted or reflected light unless stated otherwise and the phrase "generally normal" refers to a line or ray of light generally perpendicular (i.e., 90°+/−2°) to a surface of a cloaking device. The image-side TC component refracts light propagating through and exiting the image-side optical component back to generally parallel with the light from the object incident on the object-side TC component at the acute angle θ. Refracting the light with the object-side TC component and the image-side TC component provides an image of the object on the image-side of the cloaking device which, if not for the object-side and image-side TC components, would be distorted due to the tilt of the cloaking device relative to the object.

Still referring to FIG. 1, a top view of embodiments of a cloaking device assembly 10 comprising a cloaking device 100 with a pair of optical components 110, 120 is schematically depicted. A pair of TC components 150, 160 are included. In some embodiments, the cloaking device 100 may include the pair of TC components 150, 160. In other embodiments, the cloaking device 100 may not include the pair of TC components 150, 160. In such embodiments, the TC components 150, 160 may be separate from the cloaking device 100, e.g. the TC components 150, 160 may be removably attached to the cloaking device 100. The cloaking device assembly 10 includes an object-side 12, an image-side 14, and a cloaked region CR at least partially bounded by and positioned between the pair of optical components 110, 120. The object-side 12 is positioned above (+Y direction) a bisecting axis 15 and the image-side 14 is positioned below (−Y direction) the bisecting axis 15. That is, the bisecting axis 15 extends between and delineates the object-side 12 and the image-side 14. The optical component 110 and the TC component 150 may be positioned on the object-side 12 and may be referred to herein as an object-side optical component 110 and an object-side TC component 150, respectively. Also, the optical component 120 and the TC component 160 maybe positioned on the image-side 14 and may be referred to herein as an image-side optical component 120 and an image-side TC component 160, respectively. The object-side TC component 150 comprises a first end 151 positioned on a first side (+X direction) of a reference optical axis 16 extending from the object-side 12 to the image-side 14, a second end 153 positioned on a second side (−X direction) of the reference optical axis 16 opposite the first side, and a width (X direction) extending from the first end 151 to the second end 153. Similarly, the image-side TC component 160 comprises a first end 161 positioned on a first side (+X direction) of the reference optical axis 16 and a second end 163 positioned on the second side (−X direction) of the reference optical axis 16 opposite the first side, and a width (X direction) extending from the first end 161 to the second end 163.

In some embodiments, the cloaking device 100 may include a pair of transition optical components 115, 125 positioned between the object-side optical component 110 and the image-side optical component 120 as schematically depicted in FIG. 1. The pair of transition optical components 115, 125 may be utilized to reflect, refract and/or transmit light around the cloaked region CR. In such embodiments, the transition optical component 115 may be positioned between the object-side optical component 110 and the image-side optical component 120 on the first side (+X direction) of the reference optical axis 16 and may be referred to herein as a first transition optical component 115. The transition optical component 125 may be positioned between the object-side optical component 110 and the image-side optical component 120 on the second side (−X direction) of the reference optical axis 16 opposite the first side and may be referred to herein as a second transition optical component 125. In other embodiments, transition optical components 125 may not be included and the object-side optical component 110 and the image-side optical component 120 reflect, refract and/or transmit light from an object 'O' on the object-side 12 around the cloaked region CR to from an image I on the image-side 14.

Figure 2:
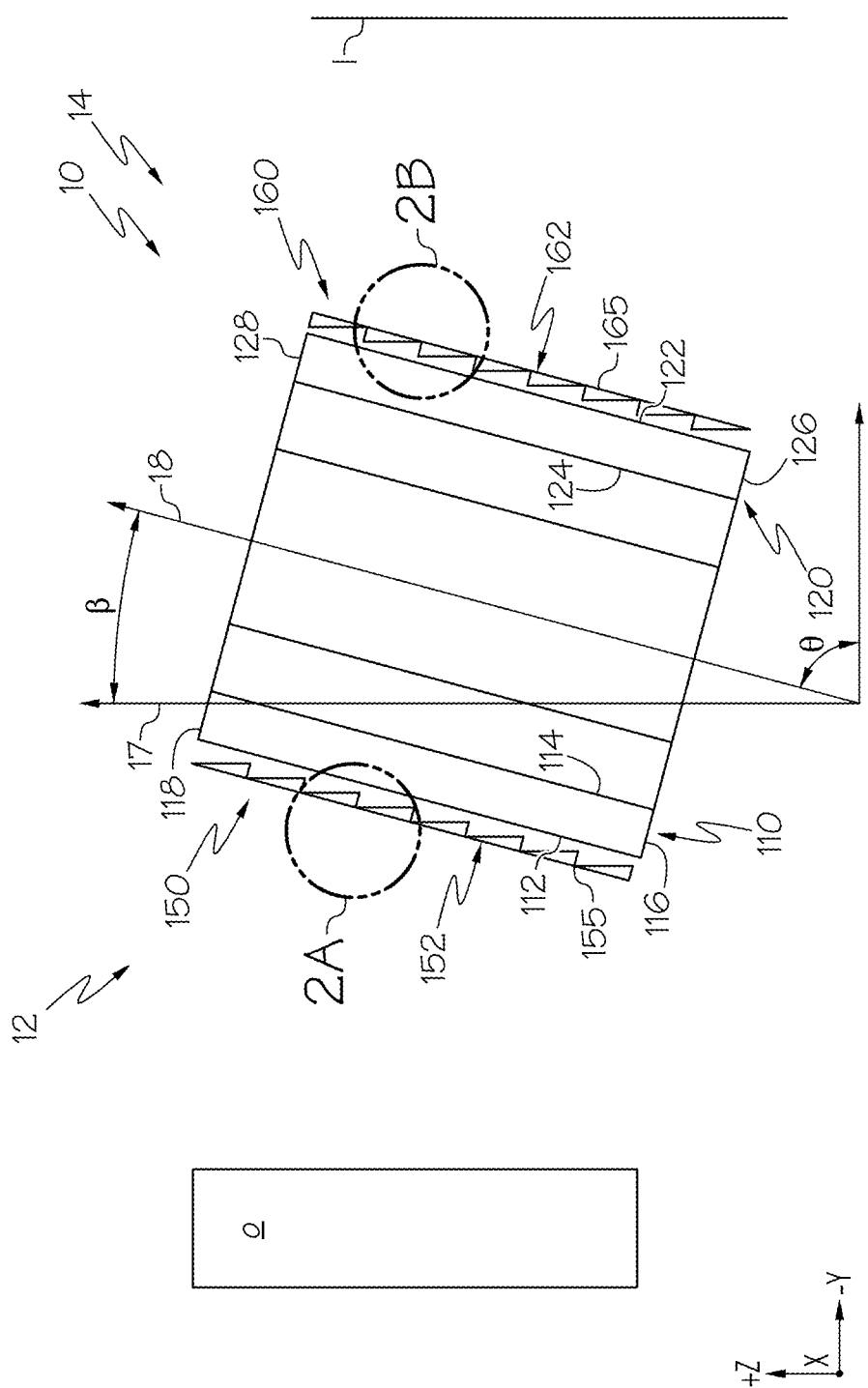
FIG. 2 schematically depicts a side view of the cloaking device with tilt correction in FIG. 1 with the cloaking device tilted at an angle β relative to a zero-tilt axis.
Figure 2A:
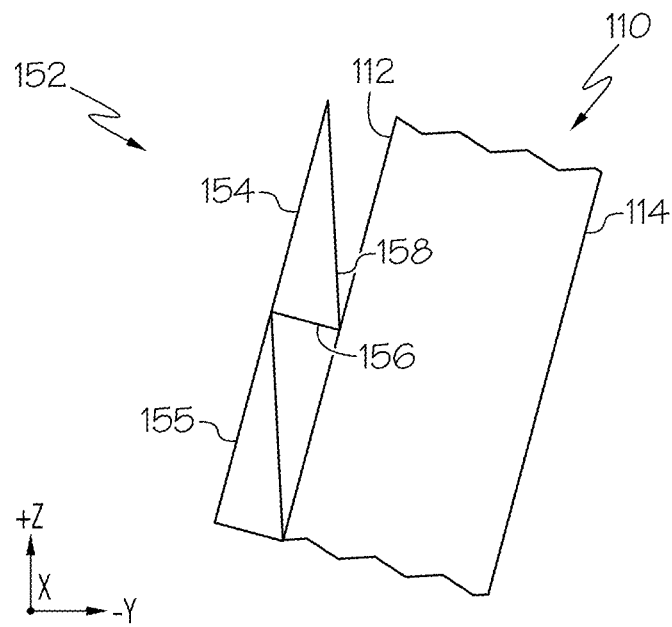
FIG. 2A schematically depicts an enlarged view of section 2A in FIG. 2.
Figure 2B:
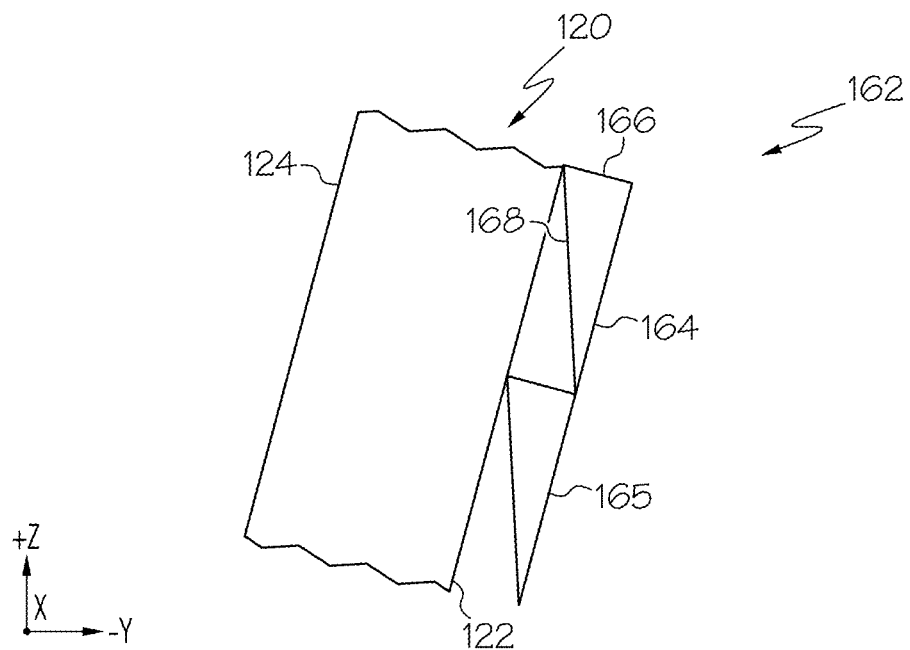
FIG. 2B schematically depicts an enlarged view of section 2B in FIG. 2.

Referring now to FIGS. 2, 2A and 2B, a side view of the cloaking device assembly 10 is schematically depicted. The object-side optical component 110 and the image-side optical component 120 comprise outward facing surfaces 112, 122, inward facing surfaces 114, 124, lower ends 116, 126 (−Z direction) and upper ends 118, 128 (−Z direction), respectively. The outward facing surfaces 112, 122 and inward facing surfaces 114, 124 of the optical components 110, 120, respectively, extend between the lower ends 116, 126 and the upper ends 118, 128, respectively. In some embodiments, the outward facing surfaces 112, 122 and the inward facing surfaces 114, 124 of the optical components 110, 120, respectively, and other outward facing and inward facing surfaces described herein, comprise one or more planar surfaces. In other embodiments, the outward facing surfaces 112, 122 and inward facing surfaces 114, 124 of the optical components 110, 120, respectively, and other outward facing and inward facing surfaces described herein, comprise one or more curved surfaces. In still other embodiments, the outward facing surfaces 112, 122 and inward facing surfaces 114, 124 of the optical components 110, 120, respectively, and other outward facing and inward facing surfaces described herein, comprise one or more planar surfaces and one or more curved surfaces.

The cloaking device assembly 10 depicted in FIGS. 2-2B, and other cloaking device assemblies described herein, may be tilted relative to a zero-tilt axis 17 extending generally parallel to the Z-axis and the object 'O' depicted in the figures. Particularly, a tilt axis 18 may extend generally parallel to the outward facing surfaces 112, 122 of the optical components 110, 120, respectively, and as depicted in FIG. 2, the outward facing surfaces 112, 122 and the tilt axis 18 may be oriented at an acute angle 'β' relative to the zero-tilt axis 17. In some embodiments, the zero-tilt axis 17, and other zero-tilt axes described herein, may be a vertical axis.

The object-side TC component 150 is positioned outwardly from and extends generally parallel to the outward facing surface 112 of the object-side optical component 110 and the image-side TC component 160 is positioned outwardly from and extends generally parallel to the outward facing surface 122 of the image-side optical component 120 as depicted in FIG. 2. The object-side TC component 150 comprises an outward facing planar surface 155, and at least one Fresnel prism 152 with a first surface 154, a second surface 156, and a hypotenuse surface 158 extending between the first surface 154 and the second surface 156 (FIG. 2A). In embodiments, the first surface 154 is an outward facing surface and the hypotenuse surface 158 is an inward facing surface, and the outward facing planar surface 155 of the object-side TC component 150 may comprise the first surface 154 of each of the least one Fresnel prisms 152. The image-side TC component 160 comprises an outward facing planar surface 165, and at least one Fresnel prism 162 with a first surface 164, a second surface 166, and a hypotenuse surface 168 extending between the first surface 164 and the second surface 166 (FIG. 2B). In embodiments, the first surface 164 is an outward facing surface and the hypotenuse surface 168 is an inward facing surface, and the outward facing planar surface 165 of the image-side TC component 160 may comprise the first surface 164 of each of the least one Fresnel prisms 162. The object-side TC component 150 and the image-side TC component 160 may extend generally parallel to the bisecting axis 15 (X direction) and generally perpendicular to the reference optical axis 16 and/or the tilt axis 18. That is, the width (X direction) of the object-side TC component 150 and the image-side TC component 160 may be oriented generally parallel to the bisecting axis 15 (e.g., see FIG. 1) and generally perpendicular to the reference optical axis 16 (FIG. 1) and tilt axis 18 (e.g., see FIG. 2).

While the outward facing planar surfaces 155, 165 of the object-side TC component 150 and the image-side TC component 160, respectively, are schematically depicted as lines in the figures, it should be understood that the outward facing planar surfaces 155, 165 may be an outward facing surface of a layer of transparent material (not shown) such as glass. Accordingly, the at least one Fresnel prism 152 and/or the at least one Fresnel prism 162 may be formed on or attached to a layer of glass, a layer of a transparent dielectric material, a layer of a transparent polymer, or the like.

Figure 3:
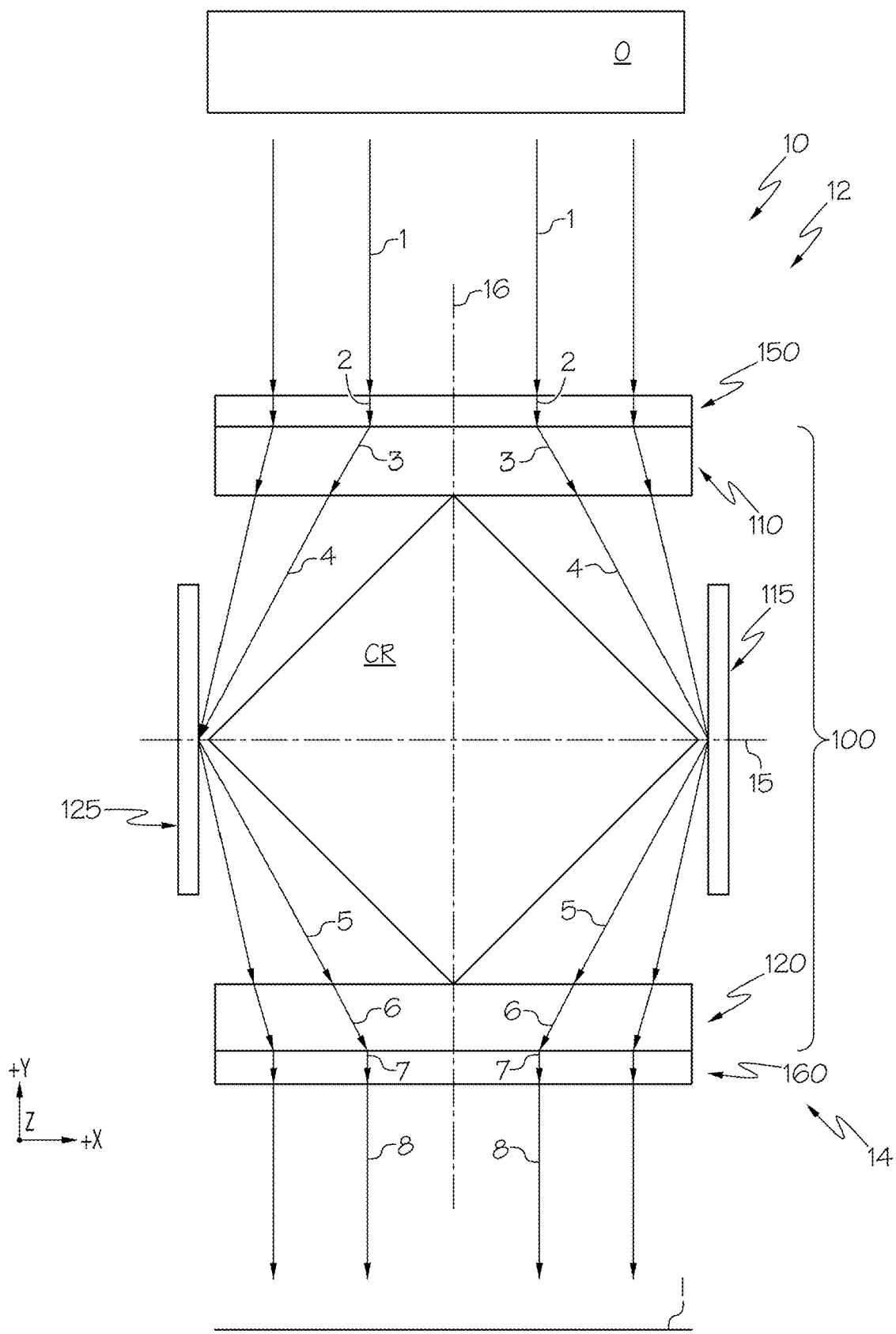
FIG. 3 schematically depicts a top view of the cloaking device with tilt correction in FIG. 1 and light propagating from an object on an object-side of the cloaking device around a cloaked region to an image-side of the cloaking device according to one or more embodiments disclosed and described herein.
Figure 4A:
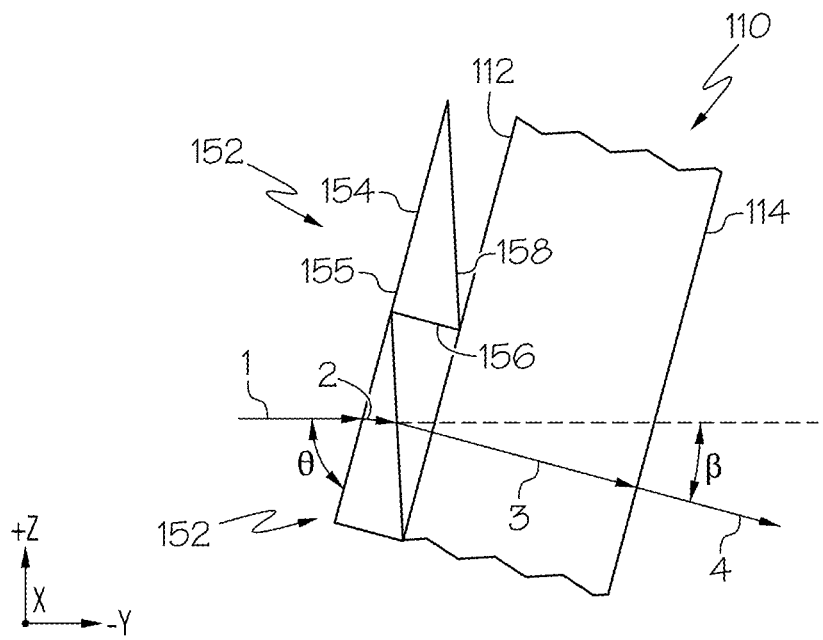
FIG. 4A schematically depicts an enlarged view of section 4A in FIG. 4.
Figure 4B:
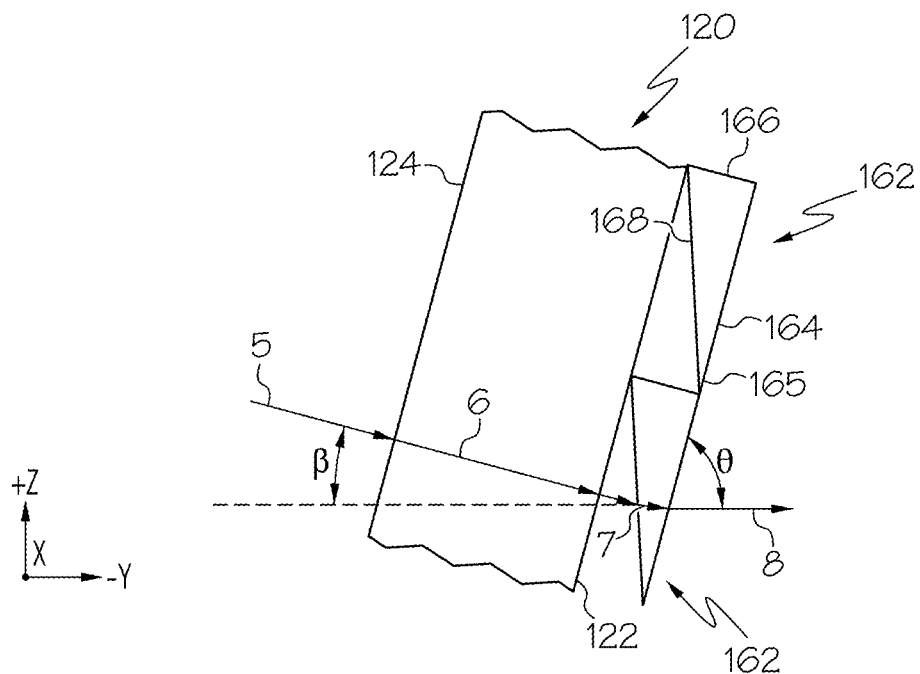
FIG. 4B schematically depicts an enlarged view of section 4B in FIG. 4.

Referring now to FIGS. 3, 4, 4A and 4B, light from the object O is schematically depicted propagating through the cloaking device assembly 10 tilted at the acute angle β relative to the zero-tilt axis 17 and the object O in the Y-Z plane. Particularly, FIG. 3 schematically depicts a top view of light from the object O propagating through the cloaking device assembly 10 in a plane normal to the tilt axis 18 and FIGS. 4, 4A and 4B schematically depict a side view of light from the object O propagating through the cloaking device assembly 10 in the Y-Z plane depicted in the figures.

Referring particularly to FIG. 3, light from the object O on the first side (+X direction) of the reference optical axis 16 (shown as arrow '1' and referred to herein as 'light 1') and light from the object O on the second side (−X direction) of the reference optical axis 16 (shown as arrow '1' and referred to herein as 'light 1') opposite the first side is incident on the object-side TC component 150. Light 1 on the first side (+X direction) and the second side (−X direction) of the reference optical axis 16 propagates through the object-side TC component 150 (shown as arrows '2' and referred to herein as 'light 2') and is incident on the object-side optical component 110. Light 3 propagates through the object-side optical component 110 (shown as arrows '3'). Particularly, light 3 on the first side (+X direction) and the second side (−X direction) of the reference optical axis 16 is reflected by, refracted by, and/or transmitted through the outward facing surface 112 (FIG. 2) of the object-side optical component 110, and propagates from the outward facing surface 112 to the inward facing surface 114 (FIG. 2) where it is reflected, refracted, and/or transmitted as light 4 (shown as arrows '4'). In embodiments where the cloaking device assembly 10 includes the first transition optical component 115 and the second transition optical component 125, the object-side optical component 110 is positioned relative to the first transition optical component 115 such that light 4 on the first side (+X direction) of the reference optical axis 16 is reflected by, refracted by and/or transmitted through the object-side optical component 110 onto the first transition optical component 115. Similarly, the object-side optical component 110 is positioned relative to the second transition optical component 125 such that light 4 on the second side (−X direction) of the reference optical axis 16 is reflected by, refracted by and/or transmitted through the object-side optical component 110 onto the second transition optical component 125. The first transition optical component 115 is positioned relative to the image-side optical component 120 such that light 4 on the first side (+X direction) of the reference optical axis 16 is reflected by, refracted by and/or transmitted through the first transition optical component 115 as light 5 (shown as arrow '5' on the first side of the reference optical axis 16) onto the image-side optical component 120. Similarly, the second transition optical component 125 is positioned relative to the image-side optical component 120 such that light 4 on the second side (−X direction) of the reference optical axis 16 is reflected by, refracted by and/or transmitted through the second transition optical component 125 as light 5 (shown as arrow '5' on the second side of the reference optical axis 16) onto the image-side optical component 120. Light 5 on the first side (+X direction) and on the second side (−X direction) of the reference optical axis 16 propagates through the image-side optical component 120 as light 6 (shown as arrows '6'). Particularly, light 5 is reflected by, refracted by, and/or transmitted through the outward facing surface 122 (FIG. 2) of the image-side optical component 120, and light 6 propagates from the outward facing surface 122 to the inward facing surface 124 (FIG. 2) where it is reflected, refracted, and/or transmitted generally parallel to light 1 from the object O on the object-side 12 in the X-Y plane. Light 6 on the first side (+X direction) and on the second side (−X direction) of the reference optical axis 16 is incident on and propagates through the image-side TC component 160 as light 7 (shown as arrows '7'). Light 8 on the first side and on the second side of the reference optical axis 16 (shown as arrows '8') exits the image-side TC component 160 to form an image 'I' on the image-side 14 of the cloaking device assembly 10.

Referring particularly to FIGS. 4-4B, light 1 propagates from the object O to the cloaking device assembly 10 generally perpendicular to the zero-tilt axis 17 and is incident on the first surface 154 of at least one Fresnel prism 152 at the angle 'θ' depicted in FIGS. 4-4B. Light 1 is refracted in the Y-Z plane depicted in the figures at the first surface 154 of the at least one Fresnel prism 152 and propagates as light 2 (FIG. 4A) to the hypotenuse surface 158. Light 2 is refracted in the Y-Z plane at the hypotenuse surface 158 generally normal to the tilt axis 18 and propagates through the object-side optical component 110 as light 3 (FIG. 4A). It should be understood that the tilt axis 18 refracts light 2 generally normal to the outward facing surface 112 of the object-side optical component 110 as schematically depicted in FIG. 4A. Light 3 exits the object-side optical component 110 as light 4 (FIG. 4A) and propagates between the object-side optical component 110 and the image-side optical component 120 as light 4 and light 5 (FIG. 4B). Light 5 is incident on and propagates through the image-side optical component 120 generally normal to the tilt axis 18 and is incident on the hypotenuse surface 168 of at least one Fresnel prism 162. Light 6 is refracted at the hypotenuse surface 168 of the at least one Fresnel prism 162 and propagates through the Fresnel prism 162 as light 7 to the first surface 164. Light 7 is refracted at the first surface 164 as light 8 generally parallel to light 1 propagating from the object O to the cloaking device assembly 10, i.e., light 8 propagates generally perpendicular to the zero-tilt axis 17. Light 8 propagates from the image-side TC component 160 and forms an image 'I' on the image-side 14 of the cloaking device assembly 10. It should be understood that, but for the utilization of the optical-side TC component 150 and the image-side TC component 160, light propagates through the cloaking device assembly 10 from the object-side 12 to the image-side 14 at an angle that is not perpendicular to the tilt axis 18. Such propagation of light (i.e., at an acute angle relative to the tilt axis 18) through the cloaking device assembly 10 from the object-side 12 to the image-side 14 may result in a distorted image I on the image-side 14 as shown and described below with reference to FIG. 13A.

Accordingly, light 1 from the object O on the first side (+X direction) and the second side (−X direction) of the reference optical axis 16 propagates to the image-side to form the image I via the optical path: Object—object-side TC component 150—object-side optical component 110—first and second transition optical components 115, 125—image-side optical component 120—image-side TC component 160—Image. That is, light 1 from the object O on the first side (+X direction) and the second side (−X direction) of the reference optical axis 16 propagates via the optical path: object O—first surface 154 of Fresnel prism 152—hypotenuse surface 158 of Fresnel prism 152—outward facing surface 112 of object-side optical component 110—inward facing surface 114 of object-side optical component 110—first and second transition optical components 115, 125—inward facing surface 124 of image-side optical component 120—outward facing surface 122 of image-side optical component 120—hypotenuse surface 168 of Fresnel prism 162—first surface 164 of Fresnel prism 162—image I.

While the cloaking device assembly 10 comprises a cloaking device 100 with a pair of optical components 110, 120, other cloaking devices may be utilized with the TC components 150, 160. Non-limiting examples of cloaking devices and cloaking device assemblies that may utilize TC components 150, 160 are disclosed in U.S. patent application Ser. No. 15/185,988 filed on Jun. 17, 2016; Ser. No. 15/423,149 filed on Feb. 2, 2017; Ser. No. 15/423,170 filed on Feb. 2, 2017; Ser. No. 15/435,996 filed on Feb. 17, 2017; Ser. No. 15/660,007 filed on Jul. 26, 2017; Ser. No. 15/668,217 filed on Aug. 3, 2017; Ser. No. 15/677,341 filed on Aug. 15, 2017; Ser. No. 15/700,740 filed on Sep. 11, 2017; Ser. No. 15/704,803 filed on Sep. 14, 2017; Ser. No. 15/813,817 filed on Nov. 15, 2017; Ser. No. 15/813,830 filed on Nov. 15, 2017; Ser. No. 15/813,845 filed on Nov. 15, 2017; Ser. No. 15/816,084 filed on Nov. 17, 2017; Ser. No. 15/863,353 filed on Jan. 5, 2018; and Ser. No. 15/883,875 filed on Jan. 30, 2018, all of which are disclosed herein in their entirety by reference. Two of such non-limiting examples of cloaking devices and cloaking device assemblies that may utilize TC components 150, 160 are described in greater detail below.

Figure 5:
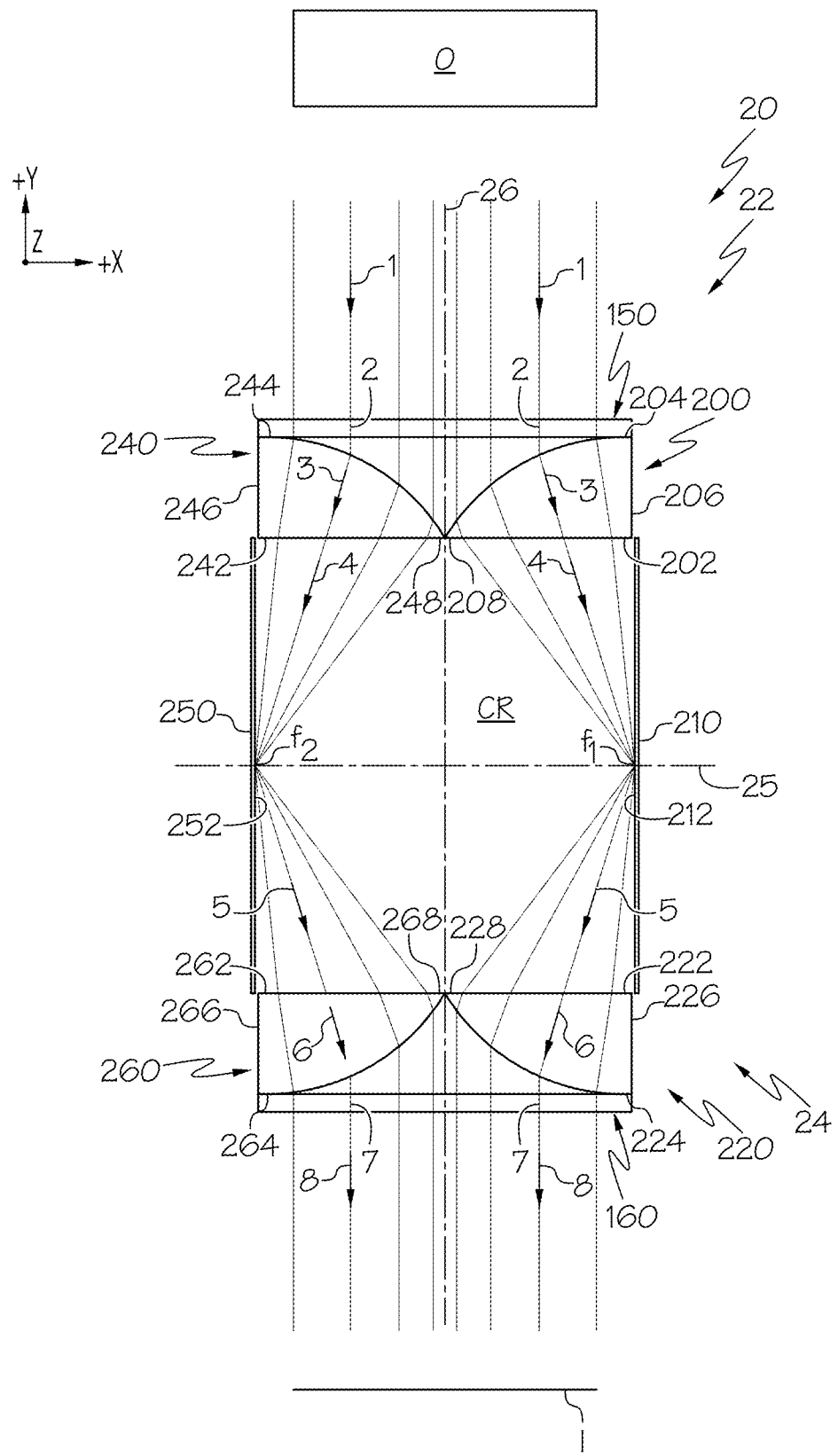
FIG. 5 schematically depicts a top view of a cloaking device with tilt correction and light propagating from an object on an object-side of the cloaking device around a cloaked region to an image-side of the cloaking device according to one or more embodiments disclosed and described herein.
Figure 6:
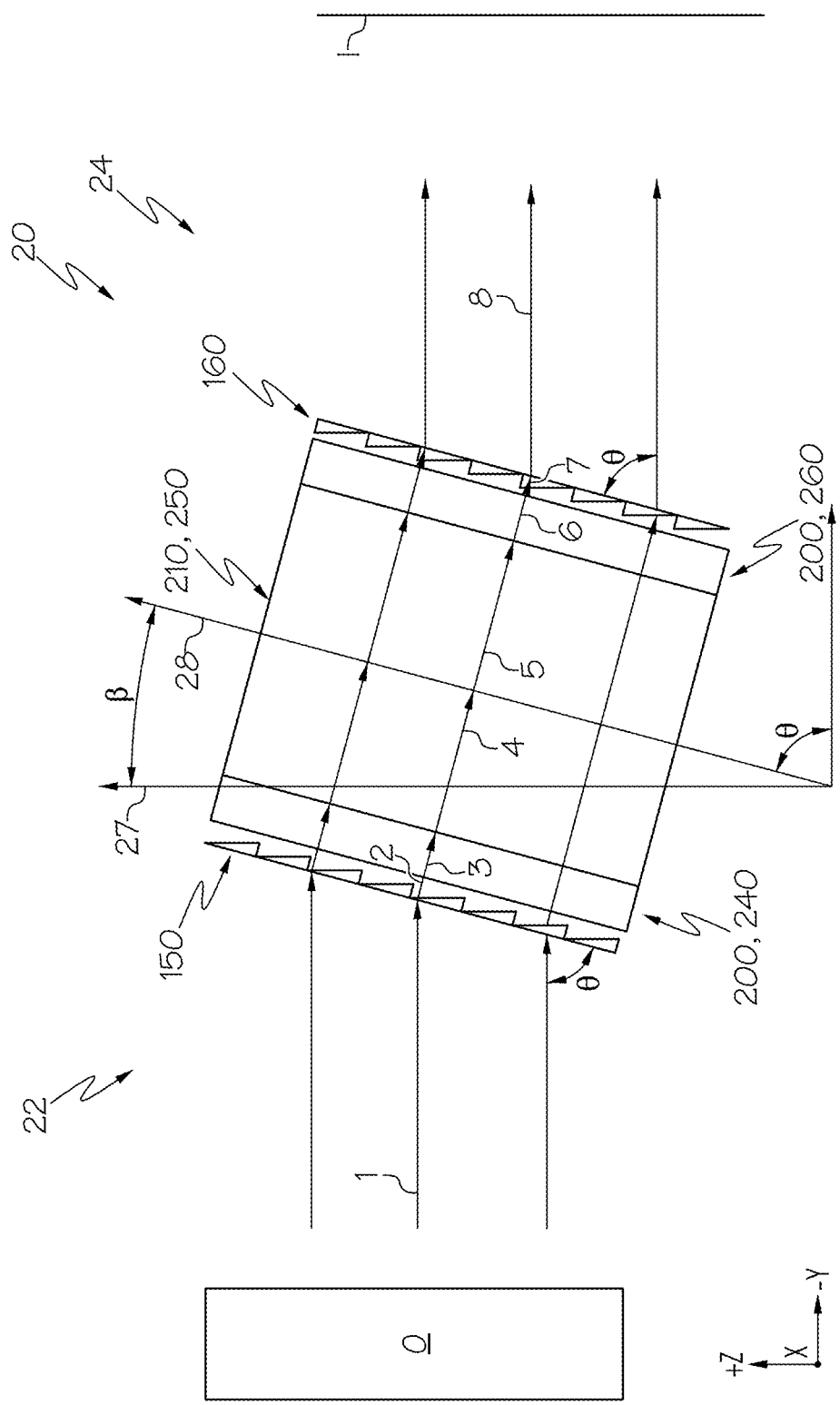
FIG. 6 schematically depicts a side view of the cloaking device with tilt correction of FIG. 5.

Referring now to FIGS. 5 and 6, embodiments of a cloaking device assembly 20 are schematically depicted with the object-side optical component 110 and the image-side optical component 120 depicted in FIG. 1 comprising half lenses. Also, the first transition optical component 115 and the second transition optical component 125, when included, may comprise a pair of planar mirrors. The cloaking device assembly 20 includes an object-side 22, an image-side 24, four half lenses 200, 220, 240, 260, and the TC components 150, 160. A cloaked region CR is positioned between the half lenses 200, 240 and half lenses 220, 260. Each of the four half lenses 200, 220, 240, 260 has a length along the X-axis, a thickness along the Y-axis and a height along the Z-axis of the coordinate axes shown in the figures. That is, the X-axis shown in the figures extends along a length of the four half lenses 200, 220, 240, 260, the Y-axis shown in the figures extends along a thickness of the four half lenses 200, 220, 240, 260, and the Z-axis shown in the figures extends along a height of the four half lenses 200, 220, 240, 260. The two half lenses 200, 240 may be positioned on the object-side 22 of the cloaking device assembly 20 to face an object 'O' and may be referred to herein as object-side half lenses 200, 240. The two half lenses 220, 260 may be positioned on the image-side 24 of the cloaking device assembly 20 to provide an image 'I' formed by the cloaking device assembly 20 and may be referred to herein as image-side half lenses 220, 260.

The half lenses 200, 220, 240, 260 each have an inward facing surface 202, 222, 242, 262 and an outward facing convex surface 204, 224, 244, 264, respectively. Also, the half lenses 200, 220, 240, 260 each have a thick end 206, 226, 246, 266 and a thin end 208, 228, 248, 268, respectively. The inward facing surfaces 202, 222, 242, 262 and outward facing convex surfaces 204, 224, 244, 264 extend between the thick ends 206, 226, 246 266 and thin ends 208, 228, 248, 268, respectively. In embodiments, the half lenses 200, 220, 240, 260 may be half cylindrical lenses, half acylindrical lenses, half achromatic lenses or half Fresnel lenses. Also, it should be understood that the half lenses 200, 220, 240, 260 may be a combination of half cylindrical lenses, half acylindrical lenses, half achromatic lenses and/or half Fresnel lenses. That is, one or more of the half lenses 200, 220, 240, 260 may be a half cylindrical lens, a half acylindrical lens, a half achromatic lens or half Fresnel lens.

Still referring to FIG. 5, the thin ends 208, 228, 248, 268 of the four half lenses 200, 220, 240, 260 are positioned proximal or adjacent to a reference optical axis 26 extending from the object-side 22 to the image-side 24. In such embodiments, the thick ends 206, 226, 246, 266 of the four half lenses 200, 220, 240, 260 are positioned distal to or spaced apart from the reference optical axis 26. Although FIG. 5 depicts the thin ends 208, 248 of the object-side half lenses 200, 240, respectively, and the thin ends 228, 268 of the image-side half lenses 220, 260, respectively, positioned in contact with each other, it should be understood that the thin ends 208, 248 and/or thin ends 228, 268 may be spaced apart from each other along the X-axis such that an uncloaked region or gap (not shown) is present between the spaced apart thin ends 208, 248 and/or spaced apart thin ends 228, 268. In such embodiments, an image of the portion of the object O positioned above (+Y direction) the uncloaked region is not provided on the image side 24 of the cloaking device assembly 20.

A planar reflection boundary 210 may be positioned between the object-side half lens 200 and the image-side half lens 220 on a first side (+X direction) of the reference optical axis 26 and a planar reflection boundary 250 may be positioned between the object-side half lens 240 and the image-side half lens 260 on a second side (−X direction) of the reference optical axis 26. In embodiments, the planar reflection boundary 210 extends from the inward facing surface 202 of the object-side half lens 200 to the inward facing surface 222 of the image-side half lens 220, and the planar reflection boundary 250 extends from the inward facing surface 242 of the object-side half lens 240 to the inward facing surface 262 of the image-side half lens 260 as depicted in FIG. 5. In other embodiments, the planar reflection boundary 210 may not extend from the inward facing surface 202 of the object-side half lens 200 to the inward facing surface 222 of the image-side half lens 220, and the planar reflection boundary 250 may not extend from the inward facing surface 242 of the object-side half lens 240 to the inward facing surface 262 of the image-side half lens 260. In such embodiments, the planar reflection boundary 210 and/or the planar reflection boundary 250 may be positioned on a bisecting axis 25 that bisects and extends between the object-side 22 and the image-side 24. That is, the planar reflection boundary 210 may be equally spaced between the inward facing surface 202 of the object-side half lens 200 and the inward facing surface 222 of the image-side half lens 220, and the planar reflection boundary 250 may be equally spaced between the inward facing surface 242 of the object-side half lens 240 and the inward facing surface 262 of the image-side half lens 260. The planar reflection boundary 210 may include an inward facing mirror surface 212 and the planar reflection boundary 250 may include an inward facing mirror surface 252. The inward facing mirror surfaces 212, 252 may be oriented parallel to the reference optical axis 26 and can be made from omnidirectional photonic crystals or mirrors.

Still referring to FIGS. 5 and 6, FIG. 5 schematically depicts a top view of light from the object O is schematically depicted propagating through the cloaking device assembly 20 tilted at the acute angle β relative to the zero-tilt axis 27 and the object O in the Y-Z plane. Particularly, FIG. 5 schematically depicts a top view of light from the object O propagating through the cloaking device assembly 20 in a plane normal to the tilt axis 28 and FIG. 5 schematically depicts a side view of light from the object O propagating through the cloaking device assembly 20 in the Y-Z plane depicted in the figures.

Light 1 on the first side (+X direction) of the reference optical axis 26 is incident on and propagates through the object-side TC component 150 as light 2. Particularly, light 1 is incident on the first surface 154 of at least one Fresnel prism 152 at the angle 'θ' (FIG. 4A) and is refracted in the Y-Z plane depicted in the figures at the first surface 154 as light 2 (FIG. 4A). Light 2 propagates to the hypotenuse surface 158 where it is refracted as light 3 in the Y-Z plane generally normal to the tilt axis 28. Light 3 propagates through the object-side half lenses 200, 240. It should be understood that refraction of light 2 normal to the tilt axis 28 refracts light 2 generally normal to the object-side half lenses 200, 240 as schematically depicted in FIG. 6. The object-side half lens 200 is positioned relative to the object-side TC component 150 such that light 2 exits the object-side TC component 150 and is incident on the outward facing convex surface 204 of the object-side half lens 200. Light 3 propagates from the outward facing convex surface 204 to the inward facing surface 202 where it is refracted and focused as light 4. The planar reflection boundary 210 is positioned relative to the object-side half lens 200 such that light 4 is focused by the object-side half lens 200 onto the inward facing mirror surface 212 where it is reflected as light 5. In embodiments, light 4 is focused by the object-side half lens 200 to a line extending in the Z-direction and intersecting a focal point $f_1$ of the object-side half lens 200 (herein referred to as "focal line $f_1$"). In such embodiments, the inward facing mirror surface 212 may be positioned at the focal line $f_1$. It should be understood that the focal line $f_1$, and other focal lines described herein, are provided by the shape of the object-side half lenses described herein. For example, the focal line $f_1$ is due to or provided by the curvature of the outward facing convex surface 204 of the object-side half lens 200. The image-side half lens 220 is positioned relative to the planar reflection boundary 210 such that light 5 reflected by and diverging from the inward facing mirror surface 212 is incident on the inward facing surface 222. Light 6 propagates from the inward facing surface 222 to the outward facing convex surface 224 where it is refracted as light 7 generally parallel to light 1 from the object O. Light 7 is incident on and propagates through the image-side TC component 160. Particularly, light 7 is incident on the hypotenuse surface 168 of at least one Fresnel prism 162 (FIG. 4B). Light 7 is refracted at the hypotenuse surface 168 of the at least one Fresnel prism 162 and propagates through the Fresnel prism 162 to the first surface 164 (FIG. 4B) where it is refracted as light 8 generally parallel to light 1 propagating from the object O to the cloaking device assembly 10. Light 8 exits and propagates from the image-side TC component 160 to provide a portion of an Image 'I' on the first side (+X direction) of the reference optical axis 26 on the image-side 24 of the cloaking device assembly 20. It should be understood that but for the utilization of the optical-side TC component 150 and the image-side TC component 160, light propagates through the cloaking device assembly 20 from the object-side 22 to the image-side 24 at an angle not perpendicular to the tilt axis 28. Such propagation of light (i.e., at an acute angle relative to the tilt axis 28) through the cloaking device assembly 20 from the object-side 22 to the image-side 24 may result in a distorted image I on the image-side 14.

Accordingly, light 1 from the object O on the first side (+X direction) of the reference optical axis 26 propagates to the image-side to form the image I on the first side of the reference optical axis 26 via the optical path: Object—object-side TC component 150—object-side half lens 200—planar reflection boundary 210—image-side half lens 220—image-side TC component 160—Image. That is, light 1 from the object O on the first side (+X direction) of the reference optical axis 26 propagates via the optical path: object O—first surface 154 of Fresnel prism 152—hypotenuse surface 158 of Fresnel prism 152—outward facing convex surface 204 of the object-side half lens 200—inward facing surface 202 of the object-side half lens 200—inward facing mirror surface 212 of the planar reflection boundary 210—hypotenuse surface 168 of Fresnel prism 162—first surface 164 of Fresnel prism 162—inward facing surface 222 of the image-side half lens 220—outward facing convex surface 224 of the image-side half lens 220—image I.

Regarding light 1 on the second side (−X direction) of the reference optical axis 26, light 1 is incident on and propagates through the object-side TC component 150 as light 2 as described above for light 2 on the first side (+X direction) of the reference optical axis 26. The object-side half lens 240 is positioned relative to the object-side TC component 150 such that light 2 exits the object-side TC component 150 and is incident on the outward facing convex surface 244 of the object-side half lens 240. Light 3 propagates from the outward facing convex surface 244 to the inward facing surface 242 where it is refracted and focused as light 4. The planar reflection boundary 250 is positioned relative to the object-side half lens 240 such that light 4 is focused by the object-side half lens 240 onto the inward facing mirror surface 252 where it is reflected as light 5. In embodiments, light 4 is focused by the object-side half lens 240 to a line extending in the Z-direction and intersecting a focal point $f_2$ of the object-side half lens 240 (herein referred to as "focal line $f_2$"). In such embodiments, the inward facing mirror surface 252 may be positioned at the focal line $f_2$. The image-side half lens 260 is positioned relative to the planar reflection boundary 250 such that light 5 reflected by and diverging from the inward facing mirror surface 252 is incident on the inward facing surface 262. Light 6 propagates from the inward facing surface 262 to the outward facing convex surface 264 where it is refracted as light 7 generally parallel to light 1 from the object O. Light 7 is incident on and propagates through the image-side TC component 160 as described above for light 7 on the first side (+X direction) of the reference optical axis 26. Light 8 exits and propagates from the image-side TC component 160 to provide a portion of an Image 'I' on the second side (−X direction) of the reference optical axis 26 on the image-side 24 of the cloaking device assembly 20.

Accordingly, light 1 from the object O on the second side (−X direction) of the reference optical axis 26 propagates to the image-side to form the image I on the second side of the reference optical axis 26 via the optical path: Object—object-side TC component 150—object-side half lens 240—planar reflection boundary 250—image-side half lens 260—image-side TC component 160—Image. That is, light 1 from the object O on the second side (−X direction) of the reference optical axis 26 propagates via the optical path: object O—first surface 154 of Fresnel prism 152—hypotenuse surface 158 of Fresnel prism 152—outward facing convex surface 244 of the object-side half lens 240—inward facing surface 242 of the object-side half lens 240—inward facing mirror surface 252 of the planar reflection boundary 250—hypotenuse surface 168 of Fresnel prism 162—first surface 164 of Fresnel prism 162—inward facing surface 262 of the image-side half lens 260—outward facing convex surface 264 of the image-side half lens 260—image I.

In combination, i.e., light 1 on the first side (+X direction) and second side (−X direction) of the reference optical axis 26 from the object O on the object-side 22 of the cloaking device assembly 20 propagates to the image-side 24 via the optical path: Object—object-side TC component 150—object-side half lenses 200, 240—planar reflection boundaries 210, 250—image-side half lenses 220, 260—image-side TC component 160—Image. That is, light 1 from the object O propagates via the optical path: object O—first surface 154 of Fresnel prism 152—hypotenuse surface 158 of Fresnel prism 152—outward facing convex surfaces 204, 244 of the object-side half lenses 200, 240, respectively—inward facing surfaces 202, 242 of the object-side half lenses 200, 240, respectively—inward facing mirror surfaces 212, 252 of the planar reflection boundaries 210, 250, respectively—inward facing surfaces 222, 262 of the image-side half lenses 220, 260, respectively—outward facing convex surfaces 224, 264 of the image-side half lenses 220, 260, respectively—hypotenuse surface 168 of Fresnel prism 162—first surface 164 of Fresnel prism 162—image I.

Figure 7:
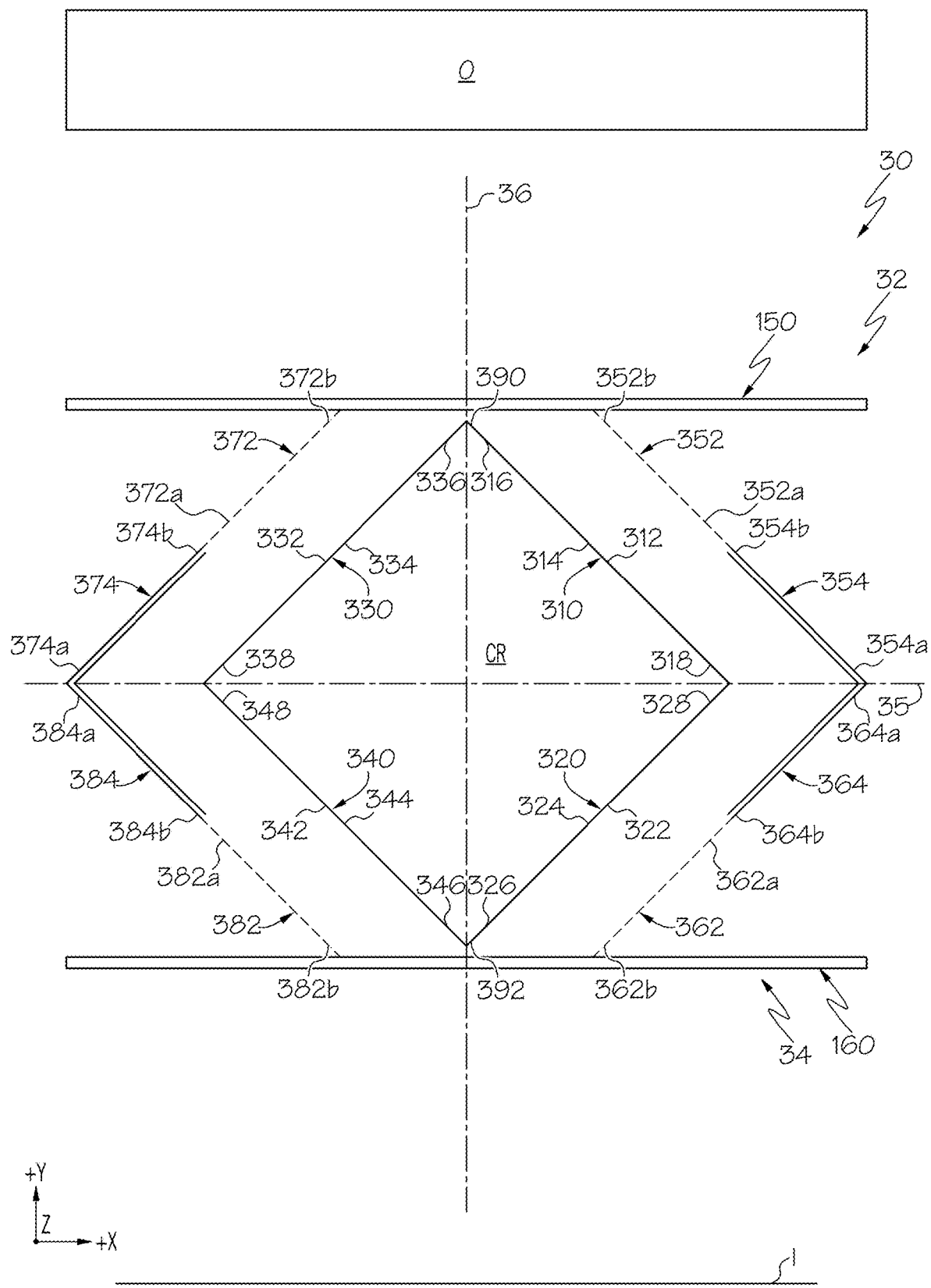
FIG. 7 schematically depicts a top view of a cloaking device with tilt correction according to one or more embodiments disclosed and described herein.
Figure 8:
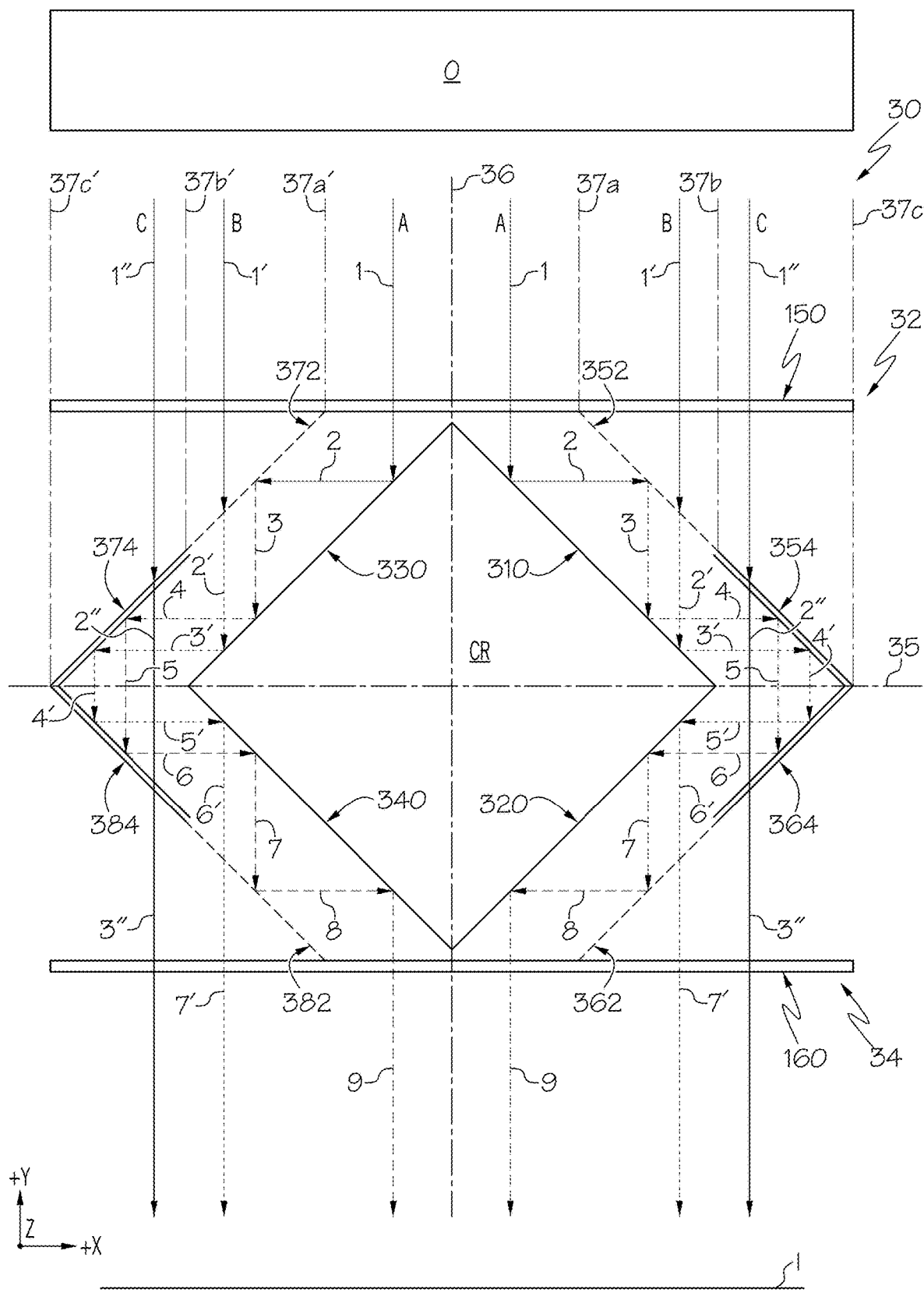
FIG. 8 schematically depicts a top view of the cloaking device with tilt correction in FIG. 7 and light propagating from an object on an object-side of the cloaking device around a cloaked region to an image-side of the cloaking device according to one or more embodiments disclosed and described herein.
Figure 9:
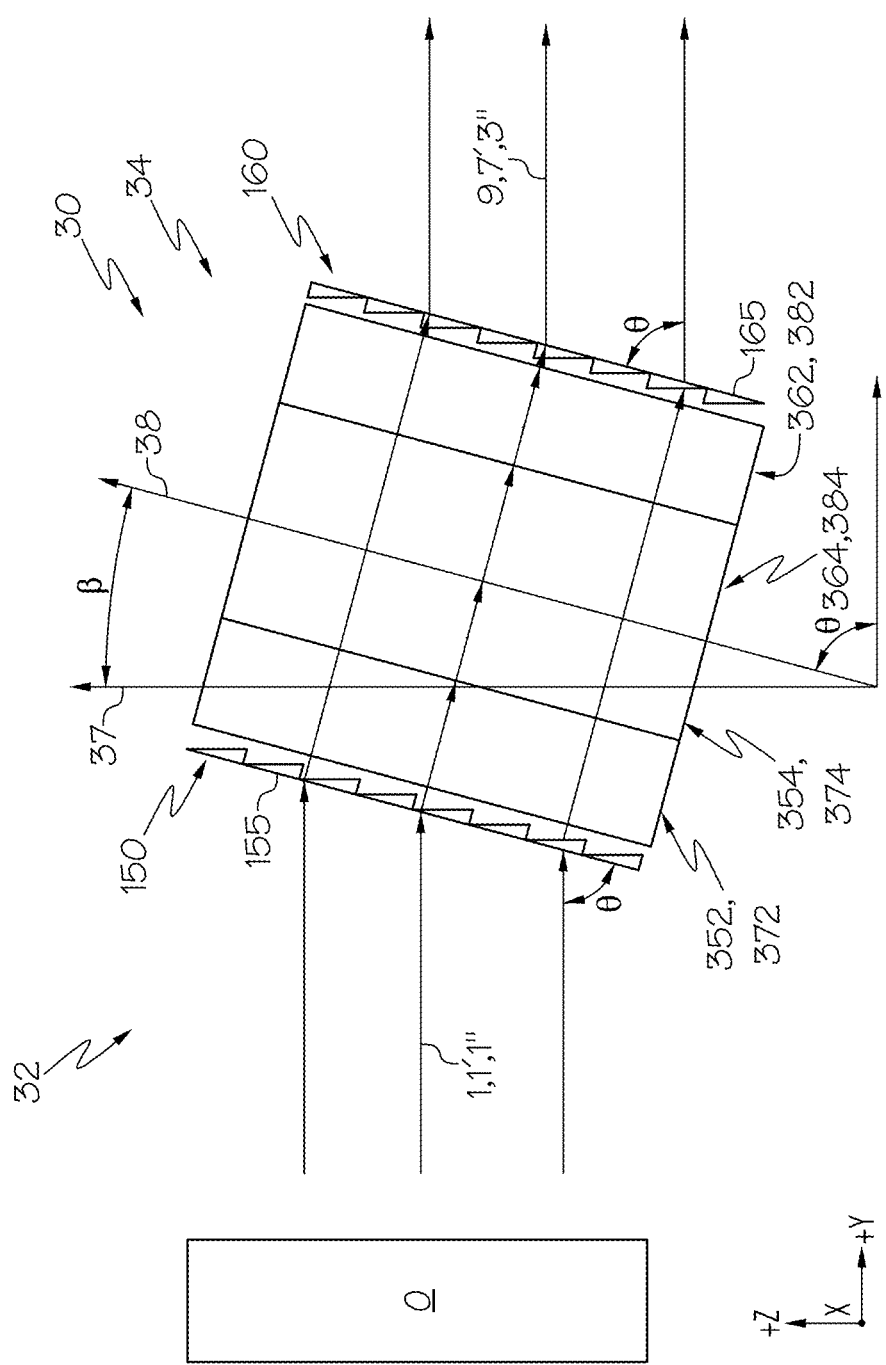
FIG. 9 schematically depicts a side view of the cloaking device with tilt correction of FIG. 8.

Referring now to FIGS. 7-9, embodiments of a cloaking device assembly 30 are schematically depicted with the object-side optical component 110 and the image-side optical component 120 depicted in FIG. 1 comprising half-mirrors and color filters. Particularly, the cloaking device assembly 30 includes an object-side 32 comprising two object-side CR reflection boundaries 310, 330, a pair of object-side half-mirrors 352, 372, a pair of object-side color filters 354, 374, and the object-side TC component 150. The cloaking device assembly 30 also includes an image-side 34 comprising two image-side CR reflection boundaries 320, 340, a pair of image-side half-mirrors 362, 382, a pair of image-side color filters 364, 384, and the image-side TC component 160. A cloaked region CR is at least partially bounded by the CR reflection boundaries 310, 320, 330, 340.

Referring particularly to FIG. 7, in embodiments, the CR reflection boundaries 310, 320, 330, 340 are planar reflection boundaries. In other embodiments, the CR reflection boundaries 310, 320, 330, 340 are not planar reflection boundaries. The object-side 32 is positioned above (+Y direction) a bisecting axis 35 and the image-side 34 is positioned below (—Y direction) the bisecting axis 35. That is, the bisecting axis 35 extends between and delineates the object-side 32 and the image-side 34. Each of the CR reflection boundaries 310, 320, 330, 340 has a length along the X-axis, a width along the Y-axis and a height along the Z-axis shown in the figures. That is, the X-axis shown in the figures extends along a length of the CR reflection boundaries 310, 320, 330, 340, the Y-axis shown in the figures extends along a width of the CR reflection boundaries 310, 320, 330, 340, and the Z-axis shown in the figures extends along a height of the CR reflection boundaries 310, 320, 330, 340.

The CR reflection boundaries 310, 320, 330, 340 each have an outward facing reflection surface 312, 322, 332, 342 and an inward facing surface 314, 324, 334, 344, respectively. In embodiments, the inward facing surfaces 314, 324, 334, 344 may be an opaque surface that prevents light from within the cloaked region CR from propagating through the CR reflection boundaries 310, 320, 330, 340, respectively. The outward facing reflection surfaces 312, 322, 332, 342 may be made from omnidirectional photonic crystals or mirrors such that light incident on the outward facing reflection surfaces 312, 322, 332, 342 is reflected there from. In the alternative, one or more of the outward facing reflection surfaces 312, 322, 332, 342 may be a surface of a prism, e.g., a right angle prism, that totally internally reflects light incident on the surface.

The CR reflection boundaries 310, 320, 330, 340 may have an apex end 316, 326, 336, 346 and a side end 318, 328, 338, 348, respectively. The side ends 318, 328, 338, 348 are spaced apart from the apex ends 316, 326, 336, 346, respectively, and the CR reflection boundaries 310, 320, 330, 340 extend between the apex ends 316, 326, 336, 346 and the side ends 318, 328, 338, 348, respectively. In embodiments, the apex ends 316, 336 of the two object-side CR reflection boundaries 310, 330, respectively, meet or intersect at an apex 390. In the alternative or in addition to, the apex ends 326, 346 of the two image-side CR reflection boundaries 320, 340, respectively, meet or intersect at an apex 392. In such embodiments, the reference optical axis 36 bisects the apex 390 and the apex 392, and may be a centerline between a first side (+X direction) and a second side (—X direction) of the cloaking device assembly 30. In other embodiments, the apex ends 316, 336 of the two object-side CR reflection boundaries 310, 330, respectively, are spaced apart (X direction) from each other and/or the apex ends 326, 346 of the two image-side CR reflection boundaries 320, 340, respectively, are spaced apart from each other such that an uncloaked region or gap (not shown) is present between the spaced apart apex ends 316, 336 and/or spaced apart apex ends 326, 346. In such embodiments, an image of the portion of the object O positioned above (+Y direction) the uncloaked region is not provided on the image-side 34 of the cloaking device assembly 30. Also, in embodiments, the side end 318 may be positioned adjacent to and may be joined to side end 328 and the side end 338 may be positioned adjacent to and may be joined to side end 348 as depicted in FIG. 7. In other embodiments, the side ends 318, 338 may be spaced apart (Y direction) from the side ends 328, 348 (not shown).

The two CR reflection boundaries 310, 330 may be positioned on the object-side 32 of the cloaking device assembly 30 to face an object 'O' and may be referred to herein as object-side CR reflection boundaries 310, 330. Also, the object-side CR reflection boundary 310 is positioned on a first side (+X direction) of the reference optical axis 36 and may be referred to herein as a first object-side CR reflection boundary 310 and the object-side CR reflection boundary 330 is positioned on a second side (−X direction) of the reference optical axis 36 opposite the first side and may be referred to herein as a second object-side CR reflection boundary 330. The two CR reflection boundaries 320, 340 may be positioned on the image-side 34 of the cloaking device assembly 30 to provide an image 'I' formed by the cloaking device assembly 30 and may be referred to herein as image-side CR reflection boundaries 320, 340. The image-side CR reflection boundary 320 is positioned on the first side (+X direction) of the reference optical axis 36 and may be referred to herein as a first image-side CR reflection boundary 320 and the image-side CR reflection boundary 340 is positioned on the second side (−X direction) of the reference optical axis 36 opposite the first side and may be referred to herein as a second image-side CR reflection boundary 340.

In embodiments, the two object-side CR reflection boundaries 310, 330 and the two image-side CR reflection boundaries 320, 340 may be oriented at an acute angle (e.g., 45°) relative to the bisecting axis 35 and the reference optical axis 36, and form the cloaked region CR that is bound at least partly by the inward facing surfaces 314, 334, 324, 344, respectively. The two object-side CR reflection boundaries 310, 330 and the two image-side CR reflection boundaries 320, 340 have a height 'h' (FIG. 3) in the Z-direction of the coordinate axes in the figures and light reflected or transmitted within the cloaked region CR does not pass through the inward facing surfaces 314, 334, 324, 344. Accordingly, an article located within the cloaked region CR (e.g., a cloaked article) is not visible to an observer viewing the cloaking device assembly 30 from the image-side 34 in the +Y direction.

Still referring to FIG. 7, the cloaking device assembly 30 may include four half-mirrors 352, 362, 372, 382 spaced apart from and positioned generally parallel (within +/−2°) with each of the CR reflection boundaries 310, 320, 330, 340, respectively. In embodiments, four color filters 354, 364, 374, 384 are spaced apart from and positioned generally parallel to each of the CR reflection boundaries 310, 320, 330, 340, respectively. As depicted in FIG. 7, in embodiments, the color filters 354, 364, 374, 384 may be co-planar with the half-mirrors 352, 362, 372, 382, respectively. In such embodiments, the half-mirrors 352, 362, 372, 382 may be positioned proximal to the reference optical axis 36 and the color filters 354, 364, 374, 384 may be positioned distal to the reference optical axis 36 as depicted in FIG. 7.

The two half-mirrors 352, 372 and the two color filters 354, 374 may be positioned on the object-side 32 of the cloaking device assembly 30 and may be referred to herein as object-side half-mirrors 352, 372 and object-side color filters 354, 374, respectively. The object-side half-mirror 352 and the object-side color filter 354 are positioned on the first side (+X direction) of the reference optical axis 36 and may be referred to herein as a first object-side half-mirror 352 and a first object-side color filter 354. The object-side half-mirror 372 and the object-side color filter 374 are positioned on the second side (−X direction) of the reference optical axis 36 opposite the first side and may be referred to herein as a second object-side half-mirror 372 and a second object-side color filter 374. The two half-mirrors 362, 382 and the two color filters 364, 384 may be positioned on the image-side 34 of the cloaking device assembly 30 and may be referred to herein as image-side half-mirrors 362, 382 and image-side color filters 364, 384, respectively. The image-side half-mirror 362 and the image-side color filter 364 are positioned on the first side (+X direction) of the reference optical axis 36 and may be referred to herein as a first image-side half-mirror 362 and a first image-side color filter 364. The image-side half-mirror 382 and the image-side color filter 384 are positioned on the second side (−X direction) of the reference optical axis 36 opposite the first side and may be referred to herein as a second image-side half-mirror 382 and a second image-side color filter 384.

The half-mirrors 352, 362, 372, 382 include a proximal end 352*a*, 362*a*, 372*a*, 382*a*, respectively, located proximal to the bisecting axis 35 and a distal end 352*b*, 362*b*, 372*b*, 382*b*, respectively, located distal from the bisecting axis 35. As used herein, the term "proximal end" refers to an end or edge of an optical component positioned proximal to a bisecting axis of a cloaking assembly (compared to a distal end of the optical component) and the term "distal end" refers to an end or edge of an optical component positioned distal from the bisecting axis of the cloaking assembly (compared to a proximal end of the optical component). The distal ends 352*b*, 362*b*, 372*b*, 382*b* are spaced apart from the proximal ends 352*a*, 362*a*, 372*a*, 382*a*, respectively, and the half-mirrors 352, 362, 372, 382 extend from the proximal ends 352*a*, 362*a*, 372*a*, 382*a* to the distal ends 352*b*, 362*b*, 372*b*, 382*b*, respectively. Also, the color filters 354, 364, 374, 384 include a proximal end 354*a*, 364*a*, 374*a*, 384*a*, respectively, proximal to the bisecting axis 35 and a distal end 354*b*, 364*b*, 374*b*, 384*b*, respectively, distal from the bisecting axis 35. The distal ends 354*b*, 364*b*, 374*b*, 384*b* are spaced apart from the proximal ends 354*a*, 364*a*, 374*a*, 384*a*, respectively, and the color filters 354, 364, 374, 384 extend from the proximal ends 354*a*, 364*a*, 374*a*, 384*a* to the distal ends 354*b*, 364*b*, 374*b*, 384*b*, respectively. In embodiments, the distal ends 354*b*, 364*b*, 374*b*, 384*b* of the color filters 354, 364, 374, 384, respectively, are positioned in contact with the proximal ends 352*a*, 362*a*, 372*a*, 382*a* of the half-mirrors 352, 362, 372, 382, respectively. In such embodiments, the distal ends 354*b*, 364*b*, 374*b*, 384*b* of the color filters 354, 364, 374, 384, respectively, may be attached to the proximal ends 352*a*, 362*a*, 372*a*, 382*a* of the half-mirrors 352, 362, 372, 382, respectively.

The half-mirrors 352, 362, 372, 382 reflect a specific mode of light. Specifically, each of the half-mirrors 352, 362, 372, 382 may be an s-polarizer half-mirror or a p-polarizer half-mirror. The half-mirrors 352, 362, 372, 382 may be in the form of a diffraction grating or thin film polarizer that reflects the s-mode of visible light and allows the p-mode of visible light to pass through (a p-polarization diffraction grating or thin film), or in the alternative, reflects the p-mode of visible light and allows the s-mode of visible light to pass through (an s-polarization diffraction grating or thin film). In embodiments, the half-mirrors 352, 362, 372, 382 are all p-polarizer half-mirrors or all s-polarizer half-mirrors. In other embodiments, the first side (+X direction) half-mirrors, i.e., half-mirrors 352, 362 are p-polarizer half-mirrors and the second side (−X direction) half-mirrors, i.e., the half-mirrors 372, 382 are s-polarizer half-mirrors. In still other embodiments, the first side (+X direction) half-mirrors, i.e., half-mirrors 352, 362 are s-polarizer half-mirrors and the second side (−X direction) half-mirrors, i.e., the half-mirrors 372, 382 are p-polarizer half-mirrors.

The color filters 354, 364, 374, 384 transmit a first range of visible light and reflect a second range of visible light. The color filters 354, 364, 374, 384 may also transmit and/or reflect portions of the ultraviolet and/or infrared electromagnetic radiation spectrum. The color filters 354, 364, 374, 384 may be in the form of a dichroic color filter. One non-limiting example of a color filter is a red color filter that transmits light with wavelengths in the red color spectrum (e.g., first range=wavelengths equal to or greater than 630 nanometers (nm)) and reflects light not in the red color spectrum (e.g., second range=wavelengths less than 630 nm). It should be understood that color filters that transmit other colors may be included and used with the cloaking devices described and illustrated herein. In embodiments, the color filters 354, 364, 374, 384 are all the same color. In other embodiments, the first side (+X direction) color filters, i.e., color filters 354, 364 are first color (e.g., red) and the second side (−X direction) color filters, i.e., the color filters 374, 384 are a second color different than the first color (e.g., blue).

Referring now to FIGS. 7 and 8, the cloaking device assembly 30 includes three optical paths for light from an object 'O' positioned on the object-side 32 to propagate and form an image T on the image-side 34 on the first side (+X direction) of the reference optical axis 36. The cloaking device assembly 30 may also include three optical paths for light from an object 'O' positioned on the object-side 32 to propagate and form an image T on the image-side 34 on the second side (−X direction) of the reference optical axis 36. Regarding the three optical paths on the first side (+X direction) of the reference optical axis 36, light from the object O incident on the cloaking device assembly 30 between the reference optical axis 36 and a first optical path transition axis 37*a* propagates via an optical path 'A'. Light from the object O incident on the cloaking device assembly 30 between the first optical path transition axis 37*a* and a second optical path transition axis 37*b* propagates via an optical path 'B'. Light from the object O positioned above (+Y direction) the cloaking device assembly 30 between the second optical path transition axis 37*b* and a third optical path transition axis 37*c* propagates via an optical path 'C'.

The first optical path transition axis 37*a* extends parallel to the Y-axis in the figures from the distal end 352*b* (FIG. 7) of the first object-side half-mirror 352 to the object O. Accordingly, light propagating via optical path A is incident on the first object-side CR reflection boundary 310. The second optical path transition axis 37*b* extends parallel to the Y-axis from the distal end 354*b* (FIG. 7) of the first object-side color filter 354 to object O. Accordingly, light propagating via optical path B is incident on the first object-side half-mirror 352. The third optical path transition axis 37*c* extends parallel to the Y-axis from the proximal end 354*a* (FIG. 7) of the first object-side color filter 354 to the object O. Accordingly, light propagating via optical path C is incident on the first object-side color filter 354.

Referring now to FIGS. 8 and 9, FIG. 8 schematically depicts a top view of light from the object O propagating through the cloaking device assembly 30 in a plane normal to the tilt axis 38 and FIG. 9 schematically depicts a side view of light from the object O propagating through the cloaking device assembly 30 in the Y-Z plane depicted in the figures and with the cloaking device assembly 30 tilted at the acute angle β relative to the zero-tilt axis 37 and the object O. Regarding the first optical path A on the first side (+X direction) of the reference optical axis 36, light 1 from the object O positioned above (+Y direction) the cloaking device assembly 30 between the reference optical axis 36 and the first optical path transition axis 37a is incident on and propagates through the object-side TC component 150. Particularly, light 1 is incident on the first surface 154 of at least one Fresnel prism 152 (FIG. 4A) where it is refracted and propagates to the hypotenuse surface 158 (e.g., see light 2 in FIG. 4A). Light 1 is refracted at the hypotenuse surface 158 generally normal to a tilt axis 38 (FIG. 9) in the Y-Z plane (e.g., see light 3 in FIG. 4A). The object-side TC component 150 is positioned relative to the first object-side CR reflection boundary 310 such that light 1 propagating through the object-side TC component 150 is incident on the first object-side CR reflection boundary 310 where it is reflected as light 2. The first object-side CR reflection boundary 310 is positioned relative to the first object-side half-mirror 352 such that light 2 reflected by the outward facing reflection surface 312 of the first object-side CR reflection boundary 310 is incident on the first object-side half-mirror 352. Light 2 is polarized by the first object-side half-mirror 352 such that one mode of light 2 is reflected by the first object-side half-mirror 352 and another mode of light 2 is transmitted through the first object-side half-mirror 352 (not shown). A non-limiting example of the first object-side half-mirror 352 in the form of a p-polarization half-mirror is depicted in FIG. 8. Accordingly, the s-mode of light 2 is reflected by the first object-side half-mirror 352 as s-polarized light 3 (shown as a dashed line in the figures). The first object-side half-mirror 352 is positioned relative to the first object-side CR reflection boundary 310 such that s-polarized light 3 is reflected by the first object-side half-mirror 352 onto the outward facing reflection surface 312 of the first object-side CR reflection boundary 310 where it is reflected as s-polarized light 4. The first object-side CR reflection boundary 310 is positioned relative to the first object-side color filter 354 such that s-polarized light 4 is reflected by the outward facing reflection surface 312 onto the first object-side color filter 354. A first range of wavelengths of the s-polarized light 4 is transmitted through the first object-side color filter 354 (not shown) and a second range of wavelengths of the s-polarized light 4 is reflected by the first object-side color filter 354 as s-polarized light 5.

The first object-side color filter 354 is positioned relative to the first image-side color filter 364 such that s-polarized light 5 is reflected by the first object-side color filter 354 onto the first image-side color filter 364. As noted above, the first image-side color filter 364 is the same type (color) of color filter as the first object-side color filter 354. Accordingly, s-polarized light 5 is reflected by the first image-side color filter 364 as s-polarized light 6. The first image-side color filter 364 is positioned relative to the first image-side CR reflection boundary 320 such that s-polarized light 6 is reflected by the first image-side color filter 364 onto the outward facing reflection surface 322 (FIG. 7) where it is reflected as s-polarized light 7. The first image-side CR reflection boundary 320 is positioned relative to the first image-side half-mirror 362 such that s-polarized light 7 is reflected by the outward facing reflection surface 322 onto the first image-side half-mirror 362. As noted above, the first image-side half-mirror 362 is the same type of half-mirror as the first object-side half-mirror 352. Accordingly, s-polarized light 7 is reflected by the first image-side half-mirror 362 as s-polarized light 8. The first image-side half-mirror 362 is positioned relative to the first image-side CR reflection boundary 320 such that s-polarized light 8 is reflected by the first image-side half-mirror 362 onto the outward facing reflection surface 322 where it is reflected as s-polarized light 9 generally parallel to light 1. The image-side TC component 160 is positioned relative to the first image-side CR reflection boundary 320 such that light 9 is incident on and propagates through the image-side TC component 160. Particularly, light 9 is incident on the hypotenuse surface 168 of at least one Fresnel prism 162 (e.g., see light 6 in FIG. 4B) where it is refracted and propagates to the first surface 164 (e.g., see light 7 in FIG. 4B). Light 9 is refracted at the first surface 164 generally parallel to light 1 in the Y-Z plane (e.g., see light 8 in FIG. 4B) and forms a portion of the image I on the image-side 34 of the cloaking device assembly 30.

Accordingly, light from the object O may travel from the object-side 32 to the image-side 34 via the first optical path A: object O—object-side TC component 150—first object-side CR reflection boundary 310—first object-side half-mirror 352—first object-side CR reflection boundary 310—first object-side color filter 354—first image-side color filter 364—first image-side CR reflection boundary 320—first image-side half-mirror 36213 first image-side CR reflection boundary 320—image-side TC component 160—image I. That is, light from the object O may travel from the object-side 32 to the image-side 34 via the first optical path A: object O—refraction at first surface 154 of Fresnel prism 152—refraction at hypotenuse surface 158 of Fresnel prism 152—reflection from first object-side CR reflection boundary 310—reflection from first object-side half-mirror 352—reflection from first object-side CR reflection boundary 310—reflection from first object-side color filter 354—reflection from first image-side color filter 364—reflection from first image-side CR reflection boundary 320—reflection from first image-side half-mirror 362—reflection from first image-side CR reflection boundary 320—refraction at hypotenuse surface 168 of Fresnel prism 162—refraction at first surface 164 of Fresnel prism 162—image I.

Regarding the second optical path B on the first side (+X direction) of the reference optical axis 36, light from the object O positioned above (+Y direction) the cloaking device assembly 30 between the first optical path transition axis 37a and the second optical path transition axis 37b is incident on the object-side TC component 150. Particularly, light 1' is incident on the first surface 154 of at least one Fresnel prism 152 (e.g., see light 1 FIG. 4A) where it is refracted and propagates to the hypotenuse surface 158 (e.g., see light 2 in FIG. 4A). Light 1' is refracted at the hypotenuse surface 158 generally normal to the tilt axis 38 (FIG. 9) in the Y-Z plane (e.g., see light 3 in FIG. 4A). The object-side TC component 150 is positioned relative to the first object-side half-mirror 352 such that light 1' propagating through the object-side TC component 150 is incident on the first object-side half-mirror 352. As noted above, a non-limiting example of the first object-side half-mirror 352 in the form of a p-polarization half-mirror is depicted in FIG. 8. Accordingly, p-polarized light (shown as a short-dash line in the figures in contrast to long-dash line for s-polarized light) is transmitted through the first object-side half-mirror 352 as p-polarized light 2'. The first object-side half-mirror 352 is positioned relative to the first object-side CR reflection boundary 310 such that p-polarized light 2' transmitted through the first object-side half-mirror 352 is incident on the first object-side CR reflection boundary 310 where it is reflected by the outward facing reflection surface 312 (FIG. 7) as p-polarized light 3'. The first object-side CR reflection boundary 310 is positioned relative to the first object-side color filter 354 such that p-polarized light 3' reflected by the outward facing reflection surface 312 is incident on the first object-side color filter 354. The first range of wavelengths of the p-polarized light 3' are transmitted through the first object-side color filter 354 (not shown) and the second range of wavelengths of the p-polarized light is reflected by the first object-side color filter 354 as p-polarized light 4'.

The first object-side color filter 354 is positioned relative to the first image-side color filter 364 such that p-polarized light 4' reflected by the first object-side color filter 354 is incident on the first image-side color filter 364 where it is reflected as p-polarized light 5'. The first image-side color filter 364 is positioned relative to the first image-side CR reflection boundary 320 such that p-polarized light 5' reflected by the first image-side color filter 364 is incident on the outward facing reflection surface 322 (FIG. 7) where it is reflected as p-polarized light 6'. The first image-side CR reflection boundary 320 is positioned relative to the first image-side half-mirror 362 such that p-polarized light 6' reflected by the outward facing reflection surface 322 is incident on the first image-side half-mirror 362. As noted above, the first image-side half-mirror 362 is the same type of half-mirror as the first object-side half-mirror 352. Accordingly, p-polarized light 6' is transmitted through the first image-side half-mirror 362 as p-polarized light 7'. The image-side TC component 160 is positioned relative to the first image-side CR reflection boundary 320 such that light 7' is incident on and propagates through the image-side TC component 160. Particularly, light 7' is incident on the hypotenuse surface 168 of at least one Fresnel prism 162 (e.g., see light 6 in FIG. 4B) where it is refracted and propagates to the first surface 164 (e.g., see light 7 in FIG. 4B). Light 7' is refracted at the first surface 164 generally parallel to light 1 in the Y-Z plane (e.g., see light 8 in FIG. 4B) and forms a portion of the image I on the image-side 34 of the cloaking device assembly 30.

Accordingly, light from the object O may travel from the object-side 32 to the image-side 34 via the second optical path B: object O—object-side TC component 150—first object-side half-mirror 352—first object-side CR reflection boundary 310—first object-side color filter 354—first image-side color filter 364—first image-side CR reflection boundary 320—first image-side half-mirror 362—image-side TC component 160—image I. That is, light from the object O may travel from the object-side 32 to the image-side 34 via the second optical path B: object O—refraction at first surface 154 of Fresnel prism 152—refraction at hypotenuse surface 158 of Fresnel prism 152—transmittance through first object-side half-mirror 352—reflection from first object-side CR reflection boundary 310—reflection from first object-side color filter 354—reflection from first image-side color filter 364—reflection from first image-side CR reflection boundary 320—transmittance through first image-side half-mirror 362—refraction at hypotenuse surface 168 of Fresnel prism 162—refraction at first surface 164 of Fresnel prism 162—image I.

Regarding the third optical path C on the first side (+X direction) of the reference optical axis 36, light 1" from the object O positioned above (+Y direction) the cloaking device assembly 30 between the second optical path transition axis 37b and the third optical path transition axis 37c is incident on the object-side TC component 150. Particularly, light 1" is incident on the first surface 154 of at least one Fresnel prism 152 (e.g., see light 1 FIG. 4A) where it is refracted and propagates to the hypotenuse surface 158 (e.g., see light 2 in FIG. 4A). Light 1" is refracted at the hypotenuse surface 158 generally normal to the tilt axis 38 (FIG. 9) in the Y-Z plane (e.g., see light 3 in FIG. 4A). The object-side TC component 150 is positioned relative to the first object-side color filter 354 such that light 1" propagating through the object-side TC component 150 is incident on the first object-side color filer 354. The first range of wavelengths of light 1" is transmitted through the first object-side color filter 354 as colored light 2". The first object-side color filer 354 is positioned relative to the first image-side color filer 364 such that colored light 2" transmitted through the first object-side color filer 354 is incident on the first image-side color filer 364 where it is transmitted through as colored light 3". The image-side TC component 160 is positioned relative to the first image-side color filter 364 such that light 3" is incident on and propagates through the image-side TC component 160. Particularly, light 3" is incident on the hypotenuse surface 168 of at least one Fresnel prism 162 (e.g., see light 6 in FIG. 4B) where it is refracted and propagates to the first surface 164 (e.g., see light 7 in FIG. 4B). Light 3" is refracted at the first surface 164 generally parallel to light 1 in the Y-Z plane (e.g., see light 8 in FIG. 4B) and forms a portion of the image I on the image-side 34 of the cloaking device assembly 30.

It should be understood that the portion of the image I formed by lighting propagating via the third optical path C (colored light 3') will have a color corresponding to the first range of wavelengths transmitted through the first object-side color filter 354 and the first image-side color filter 364.

Accordingly, light from the object O may travel from the object-side 32 to the image-side 34 via the third optical path C: object O—object-side TC component 150—first object-side color filter 354—first image-side color filter 364—image-side TC component 160—image I. That is, light from the object O may travel from the object-side 32 to the image-side 34 via the third optical path C: object O—refraction at first surface 154 of Fresnel prism 152—refraction at hypotenuse surface 158 of Fresnel prism 152—transmittance through first object-side color filter 354—transmittance through first image-side color filter 364—refraction at hypotenuse surface 168 of Fresnel prism 162—refraction at first surface 164 of Fresnel prism 162—image I.

Still referring to FIGS. 8 and 9, and regarding the three optical paths on the second side (−X direction) of the reference optical axis 36, light from the object O incident on the cloaking device assembly 30 between the reference optical axis 36 and a first optical path transition axis 37a' propagates via an optical path 'A'. Light from the object O incident on the cloaking device assembly 30 between the first optical path transition axis 37a' and a second optical path transition axis 37b' propagates via an optical path 'B'. Light from the object O positioned above (+Y direction) the cloaking device assembly 30 between the second optical path transition axis 37b' and a third optical path transition axis 37c' propagates via an optical path 'C'.

The first optical path transition axis 37a' extends parallel to the Y-axis in the figures from the distal end 372b (FIG. 7) of the second object-side half-mirror 372 to the object O. Accordingly, light propagating via optical path A is incident on the second object-side CR reflection boundary 330. The second optical path transition axis 37b' extends parallel to the Y-axis from the distal end 374b (FIG. 7) of the second object-side color filter 374 to object O. Accordingly, light propagating via optical path B is incident on the second object-side half-mirror 372. The third optical path transition axis 37c' extends parallel to the Y-axis from the proximal end 374a (FIG. 7) of the second object-side color filter 374 to the object O. Accordingly, light propagating via optical path C is incident on the second object-side color filter 374.

Regarding the first optical path A on the second side (−X direction) of the reference optical axis 36, light 1 from the object O positioned above (+Y direction) the cloaking device assembly 30 between the reference optical axis 36 and the first optical path transition axis 37a' is incident on and propagates through the object-side TC component 150. Particularly, light 1 is incident on the first surface 154 of at least one Fresnel prism 152 (FIG. 4A) where it is refracted and propagates to the hypotenuse surface 158 (e.g., see light 2 in FIG. 4A). Light 1 is refracted at the hypotenuse surface 158 generally normal to a tilt axis 38 (FIG. 9) in the Y-Z plane (e.g., see light 3 in FIG. 4A). The object-side TC component 150 is positioned relative to the second object-side CR reflection boundary 330 such that light 1 propagating through the object-side TC component 150 is incident on the second object-side CR reflection boundary 330 where it is reflected as light 2. The second object-side CR reflection boundary 330 is positioned relative to the second object-side half-mirror 372 such that light 2 reflected by the outward facing reflection surface 332 of the second object-side CR reflection boundary 330 is incident on the second object-side half-mirror 372. Light 2 is polarized by the second object-side half-mirror 372 such that one mode of light 2 is reflected by the second object-side half-mirror 372 and another mode of light 2 is transmitted through the second object-side half-mirror 372 (not shown). A non-limiting example of the second object-side half-mirror 372 in the form of a p-polarization half-mirror is depicted in FIG. 8. Accordingly, the s-mode of light 2 is reflected by the second object-side half-mirror 372 as s-polarized light 3. The second object-side half-mirror 372 is positioned relative to the second object-side CR reflection boundary 330 such that s-polarized light 3 is reflected by the second object-side half-mirror 372 onto the outward facing reflection surface 332 of the second object-side CR reflection boundary 330 where it is reflected as s-polarized light 4. The second object-side CR reflection boundary 330 is positioned relative to the second object-side color filter 374 such that s-polarized light 4 is reflected by the outward facing reflection surface 332 onto the second object-side color filter 374. A first range of wavelengths of the s-polarized light 4 is transmitted through the second object-side color filter 374 (not shown) and a second range of wavelengths of the s-polarized light 4 is reflected by the second object-side color filter 374 as s-polarized light 5.

The second object-side color filter 374 is positioned relative to the second image-side color filter 384 such that s-polarized light 5 is reflected by the second object-side color filter 374 onto the second image-side color filter 384. As noted above, the second image-side color filter 384 is the same type (color) of color filter as the second object-side color filter 374. Accordingly, s-polarized light 5 is reflected by the second image-side color filter 384 as s-polarized light 6. The second image-side color filter 384 is positioned relative to the second image-side CR reflection boundary 340 such that s-polarized light 6 is reflected by the second image-side color filter 384 onto the outward facing reflection surface 342 (FIG. 7) where it is reflected as s-polarized light 7. The second image-side CR reflection boundary 340 is positioned relative to the second image-side half-mirror 382 such that s-polarized light 7 is reflected by the outward facing reflection surface 342 onto the second image-side half-mirror 382. As noted above, the second-image-side half-mirror 382 is the same type of half-mirror as the second object-side half-mirror 372. Accordingly, s-polarized light 7 is reflected by the second image-side half-mirror 382 as s-polarized light 8. The second image-side half-mirror 382 is positioned relative to the second image-side CR reflection boundary 340 such that s-polarized light 8 is reflected by the second image-side half-mirror 382 onto the outward facing reflection surface 342 where it is reflected as s-polarized light 9 generally parallel to light 1. The image-side TC component 160 is positioned relative to the second image-side CR reflection boundary 340 such that light 9 is incident on and propagates through the image-side TC component 160. Particularly, light 9 is incident on the hypotenuse surface 168 of at least one Fresnel prism 162 (e.g., see light 6 in FIG. 4B) where it is refracted and propagates to the first surface 164 (e.g., see light 7 in FIG. 4B). Light 9 is refracted at the first surface 164 generally parallel to light 1 in the Y-Z plane (e.g., see light 8 in FIG. 4B) and forms a portion of the image I on the image-side 34 of the cloaking device assembly 30.

Accordingly, light from the object O may travel from the object-side 32 to the image-side 34 via the first optical path A: object O—object-side TC component 150—second object-side CR reflection boundary 330—second object-side half-mirror 372—second object-side CR reflection boundary 330—second object-side color filter 374—second image-side color filter 384—second image-side CR reflection boundary 340—second image-side half-mirror 382—second image-side CR reflection boundary 340—image-side TC component 160—image I. That is, light from the object O may travel from the object-side 32 to the image-side 34 via the first optical path A: object O—refraction at first surface 154 of Fresnel prism 152—refraction at hypotenuse surface 158 of Fresnel prism 152—reflection from second object-side CR reflection boundary 330—reflection from second object-side half-mirror 372—reflection from second object-side CR reflection boundary 330—reflection from second object-side color filter 374—reflection from second image-side color filter 384—reflection from second image-side CR reflection boundary 340—reflection from second image-side half-mirror 382—reflection from second image-side CR reflection boundary 340—refraction at hypotenuse surface 168 of Fresnel prism 162—refraction at first surface 164 of Fresnel prism 162—image I.

Regarding the second optical path B on the second side (−X direction) of the reference optical axis 36, light 1' from the object O positioned above (+Y direction) the cloaking device assembly 30 between the first optical path transition axis 37a' and the second optical path transition axis 37b' is incident on and propagates through the object-side TC component 150. Particularly, light 1' is incident on the first surface 154 of at least one Fresnel prism 152 (e.g., see light 1 FIG. 4A) where it is refracted and propagates to the hypotenuse surface 158 (e.g., see light 2 in FIG. 4A). Light 1' is refracted at the hypotenuse surface 158 generally normal to the tilt axis 38 (FIG. 9) in the Y-Z plane (e.g., see light 3 in FIG. 4A). The second object-side half-mirror 372 is positioned relative to the object-side TC component 150 such that light 1' propagating through and exiting the object-side TC component 150 is incident on the second object-side half-mirror 372. As noted above, a non-limiting example of the second object-side half-mirror 372 in the form of a p-polarization half-mirror is depicted in FIG. 8. Accordingly, p-polarized light (shown as a short-dash line in the figures in contrast to long-dash line for s-polarized light) is transmitted through the second object-side half-mirror 372 as p-polarized light 2'. The second object-side half-mirror 372 is positioned relative to the second object-side CR reflection boundary 330 such that p-polarized light 2' transmitted through the second object-side half-mirror 372 is incident on the second object-side CR reflection boundary 330 where it is reflected by the outward facing reflection surface 332 (FIG. 7) as p-polarized light 3'. The second object-side CR reflection boundary 330 is positioned relative to the second object-side color filter 374 such that p-polarized light 3' reflected by the outward facing reflection surface 332 is incident on the second object-side color filter 374. The first range of wavelengths of the p-polarized light 3' is transmitted through the second object-side color filter 374 (not shown) and the second range of wavelengths of the p-polarized light is reflected by the second object-side color filter 374 (shown as arrow '4' in FIG. 8 and referred to herein simply as 'p-polarized light 4'').

The second object-side color filter 374 is positioned relative to the second image-side color filter 384 such that p-polarized light 4' reflected by the second object-side color filter 374 is incident on the second image-side color filter 384 where it is reflected as p-polarized light 5'. The second image-side color filter 384 is positioned relative to the second image-side CR reflection boundary 340 such that p-polarized light 5' reflected by the second image-side color filter 384 is incident on the outward facing reflection surface 342 (FIG. 7) where it is reflected as p-polarized light 6'. The second image-side CR reflection boundary 340 is positioned relative to the second image-side half-mirror 382 such that p-polarized light 6' reflected by the outward facing reflection surface 342 is incident on the second image-side half-mirror 382. As noted above, the second-image-side half-mirror 382 is the same type of half-mirror as the second object-side half-mirror 372. Accordingly, p-polarized light 6' is transmitted through the second image-side half-mirror 382 as p-polarized light 7'. The image-side TC component 160 is positioned relative to the second image-side half-mirror 382 such that light 7' is incident on and propagates through the image-side TC component 160. Particularly, light 7' is incident on the hypotenuse surface 168 of at least one Fresnel prism 162 (e.g., see light 6 in FIG. 4B) where it is refracted and propagates to the first surface 164 (e.g., see light 7 in FIG. 4B). Light 7' is refracted at the first surface 164 generally parallel to light 1 in the Y-Z plane (e.g., see light 8 in FIG. 4B) and forms a portion of the image I on the image-side 34 of the cloaking device assembly 30.

Accordingly, light from the object O may travel from the object-side 32 to the image-side 34 via the second optical path B: object O—object-side TC component 150—second object-side half-mirror 372—second object-side CR reflection boundary 330—second object-side color filter 374—second image-side color filter 384—second image-side CR reflection boundary 340—second image-side half-mirror 382—image-side TC component 160—image I. That is, light from the object O may travel from the object-side 32 to the image-side 34 via the second optical path B: object O—refraction at first surface 154 of Fresnel prism 152—refraction at hypotenuse surface 158 of Fresnel prism 152—transmittance through second object-side half-mirror 372—reflection from second object-side CR reflection boundary 330—reflection from second object-side color filter 374—reflection from second image-side color filter 384—reflection from second image-side CR reflection boundary 340—transmittance through second image-side half-mirror 382—refraction at hypotenuse surface 168 of Fresnel prism 162—refraction at first surface 164 of Fresnel prism 162—image I.

Regarding the third optical path C on the second side (−X direction) of the reference optical axis 36, light 1″ from the object O positioned above (+Y direction) the cloaking device assembly 30 between the second optical path transition axis 37b' and the third optical path transition axis 37c' is incident on the object-side TC component 150. Particularly, light 1″ is incident on the first surface 154 of at least one Fresnel prism 152 (e.g., see light 1 FIG. 4A) where it is refracted and propagates to the hypotenuse surface 158 (e.g., see light 2 in FIG. 4A). Light 1″ is refracted at the hypotenuse surface 158 generally normal to the tilt axis 38 (FIG. 9) in the Y-Z plane (e.g., see light 3 in FIG. 4A). The object-side TC component 150 is positioned relative to the second object-side color filter 374 such that light 1″ propagating through the object-side TC component 150 is incident on the second object-side color filer 374. The first range of wavelengths of light 1″ is transmitted through the second object-side color filter 374 as colored light 2″. The second object-side color filer 374 is positioned relative to the second image-side color filer 384 such that colored light 2″ transmitted through the second object-side color filer 374 is incident on the second image-side color filer 384 where it is transmitted through as colored light 3″. The image-side TC component 160 is positioned relative to the second image-side color filter 384 such that light 3″ is incident on and propagates through the image-side TC component 160. Particularly, light 3″ is incident on the hypotenuse surface 168 of at least one Fresnel prism 162 (e.g., see light 6 in FIG. 4B) where it is refracted and propagates to the first surface 164 (e.g., see light 7 in FIG. 4B). Light 3″ is refracted at the first surface 164 generally parallel to light 1 in the Y-Z plane (e.g., see light 8 in FIG. 4B) and forms a portion of the image I on the image-side 34 of the cloaking device assembly 30.

It should be understood that the portion of the image I formed by lighting propagating via the third optical path C (colored light 3″) will have a color corresponding to the first range of wavelengths transmitted through the second object-side color filter 374 and the second image-side color filter 384.

Accordingly, light from the object O may travel from the object-side 32 to the image-side 34 via the third optical path C: object O—object-side TC component 150—second object-side color filter 374—second image-side color filter 384—image-side TC component 160—image I. That is, light from the object O may travel from the object-side 32 to the image-side 34 via the second optical path C: object O—refraction at first surface 154 of Fresnel prism 152—refraction at hypotenuse surface 158 of Fresnel prism 152—transmittance through second object-side color filter 374—transmittance through second image-side color filter 384—refraction at hypotenuse surface 168 of Fresnel prism 162—refraction at first surface 164 of Fresnel prism 162—image I.

In combination, i.e., light 1 on the first side (+X direction) and the second side (−X direction) of the reference optical axis 36 from the object O on the object-side 32 of the cloaking device assembly 30 propagates to the image-side 34 via the first optical paths A: object O—refraction at first surface 154 of Fresnel prism 152—refraction at hypotenuse surface 158 of Fresnel prism 152—reflection from first and second object-side CR reflection boundaries 310, 330—reflection from first and second object-side half-mirrors 352, 372—reflection from first and second object-side CR reflection boundaries 310, 330—reflection from first and second object-side color filters 354, 374—reflection from first and second image-side color filters 364, 384—reflection from first and second image-side CR reflection boundaries 320,

340—reflection from first and second image-side half-mirrors 362, 382—reflection from first and second image-side CR reflection boundaries 320, 340—refraction at hypotenuse surface 168 of Fresnel prism 162—refraction at first surface 164 of Fresnel prism 162—image I. Light 1' on the first side (+X direction) and the second side (−X direction) of the reference optical axis 36 from the object O on the object-side 32 of the cloaking device assembly 30 propagates to the image-side 34 via the second optical paths B: object O—refraction at first surface 154 of Fresnel prism 152—refraction at hypotenuse surface 158 of Fresnel prism 152—transmittance through first and second object-side half-mirrors 352, 372—reflection from first and second object-side CR reflection boundaries 310, 330, respectively—reflection from first and second object-side color filters 354, 374—reflection from first and second image-side color filters 364, 384—reflection from first and second image-side CR reflection boundaries 320, 340—transmittance through first and second image-side half-mirrors 362, 382—refraction at hypotenuse surface 168 of Fresnel prism 162—refraction at first surface 164 of Fresnel prism 162—image I. Light 1" on the first side (+X direction) and the second side (−X direction) of the reference optical axis 36 from the object O on the object-side 32 of the cloaking device assembly 30 propagates to the image-side 34 via the third optical paths C: object O—refraction at first surface 154 of Fresnel prism 152—refraction at hypotenuse surface 158 of Fresnel prism 152—transmittance through first and second object-side color filters 354, 374—transmittance through first and second image-side color filters 364, 384—refraction at hypotenuse surface 168 of Fresnel prism 162—refraction at first surface 164 of Fresnel prism 162—image I.

It should be understood that but for the utilization of the optical-side TC component 150 and the image-side TC component 160, light propagate through the cloaking device assembly 30 from the object-side 32 to the image-side 34 at an angle not perpendicular to the tilt axis 28. Such propagation of light (i.e., at an acute angle relative to the tilt axis 38) through the cloaking device assembly 30 from the object-side 32 to the image-side 34 may result in a distorted image I on the image-side 34.

While FIGS. 7 and 8 depict the CR reflection boundaries 310, 320, 330, 340, the half-mirrors 352, 362, 372, 382, and the color filters 354, 364, 374, 384 as stand-alone components, it should be understood that the CR reflection boundaries 310, 320, 330, 340, the half-mirrors 352, 362, 372, 382, and the color filters 354, 364, 374, 384 may be provided as a single unit or a plurality of assembled units. For example, the CR reflection boundaries 310, 320, 330, 340, the half-mirrors 352, 362, 372, 382, and the color filters 354, 364, 374, 384 may be formed from a plurality of prisms that comprise the CR reflection boundaries 310, 320, 330, 340, the half-mirrors 352, 362, 372, 382, and the color filters 354, 364, 374, 384. In contrast, or in addition to, the half-mirrors 352, 362, 372, 382 may be in the form of wire-grid polarizer—cube beamsplitters (not shown). It should also be understood that the cloaking device assembly 30 may cloak an object within the cloaked region CR including only the first object-side and image-side CR reflection boundaries 310, 320, the first object-side and image-side half-mirrors 352, 362, and the first object-side and image-side color filters 354, 364. That is, an object positioned on the first side (+X direction) of the reference optical axis 36 within the cloaked region CR would be cloaked by the first object-side and image-side CR reflection boundaries 310, 320, first object-side and image-side half-mirrors 352, 362, and first object-side and image-side color filters 354, 364. In the alternative, an object positioned on the second side (−X direction) of the reference optical axis 36 within the cloaked region CR would be cloaked by the second object-side and image-side CR reflection boundaries 330, 340, second object-side and image-side half-mirrors 372, 382, and second object-side and image-side color filters 374, 384.

Figure 10:
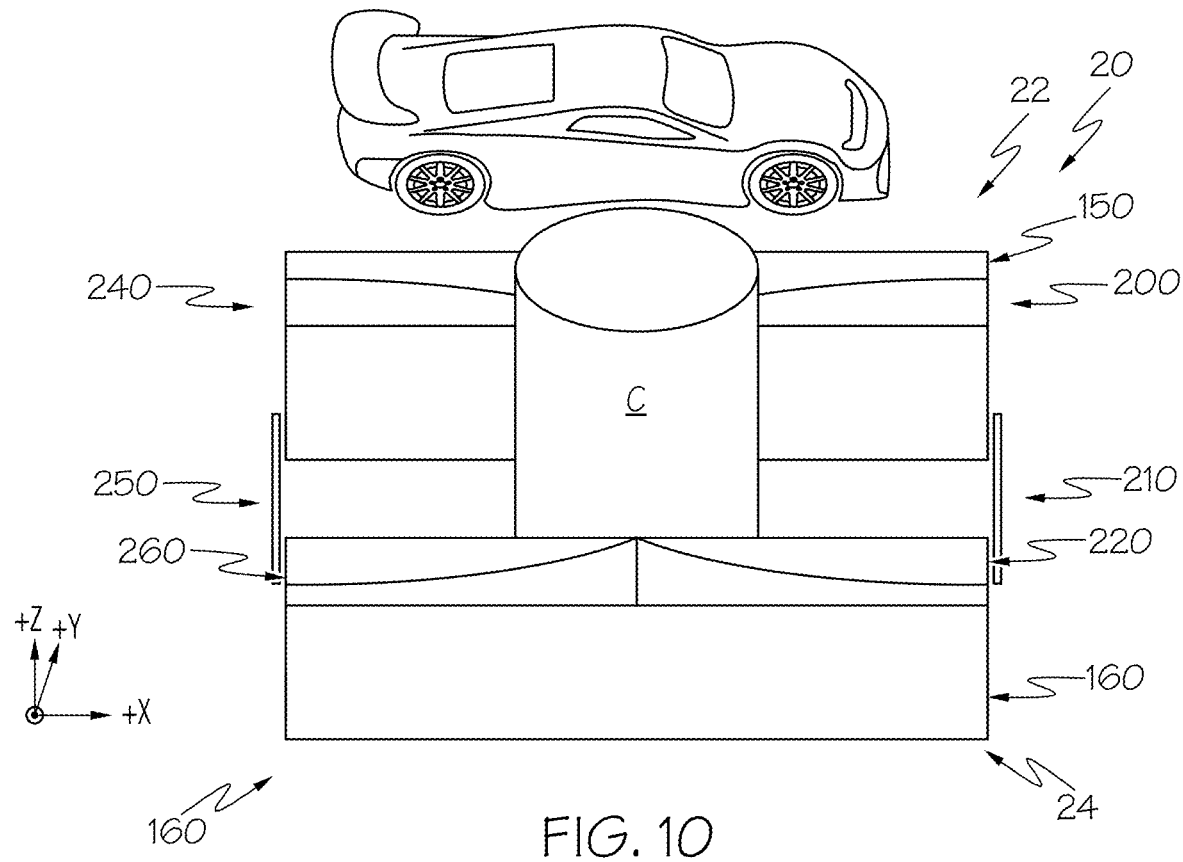
FIG. 10 schematically depicts a top perspective view of the cloaking device of FIGS. 5 and 6 with a first object on one side of the cloaking device and a second object within the cloaked region of the cloaking device according to one or more embodiments disclosed and described herein.
Figure 11:
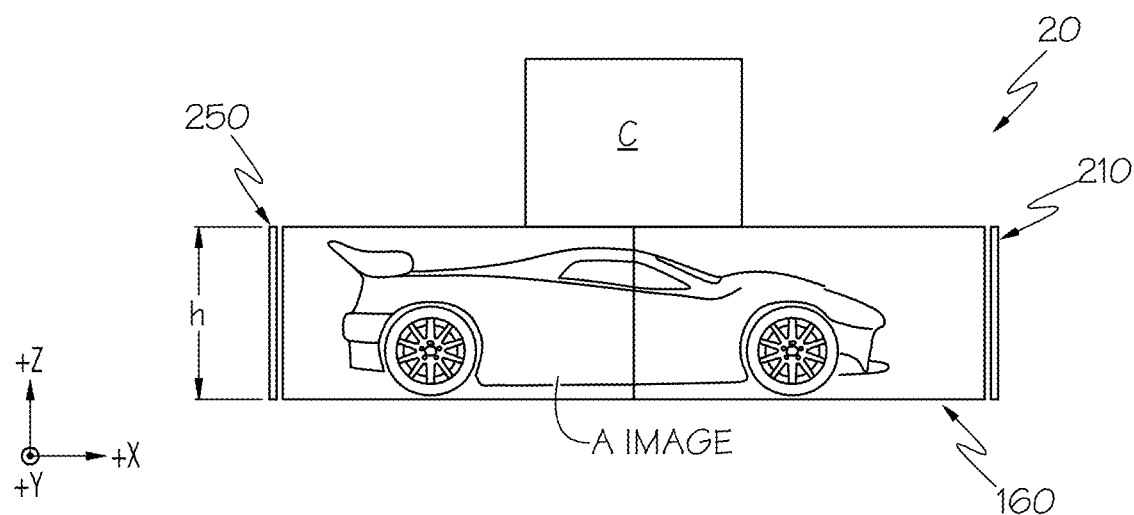
FIG. 11 schematically depicts a side view of the cloaking device of FIG. 10 with the first object on one side of the cloaking device and the second object within the cloaked region of the cloaking device.

Referring now to FIGS. 3, 10 and 11, a top perspective view and a side view of a cloaking device according to embodiments as discussed with respect to FIG. 3 are shown in FIGS. 10 and 11, respectively. Specifically, FIG. 10 is a top perspective view of an article in the form of a column 'C' within the cloaked region CR of the cloaking device assembly 20 and an automobile 'A' located behind the column C on the object-side 22 of the cloaking device assembly 20 in the +Y direction. The column C has a height dimension in the Z direction (increasing height in the +Z direction) greater than the height h of the cloaking device (FIG. 11). FIG. 11 is a side view from the +Y direction of the cloaking device assembly 20 shown in FIG. 3 and shows the portion of the column C that is within the cloaked region is not visible and the automobile A located behind the column C in the +Y direction is visible to an observer viewing the cloaking device assembly 20 in the +Y direction. Accordingly, the column C positioned within the cloaked region is not visible to an observer viewing the image-side 24 of the cloaking device assembly 20 and an image of the automobile A is visible to the observer viewing the image-side 24.

Figure 12:
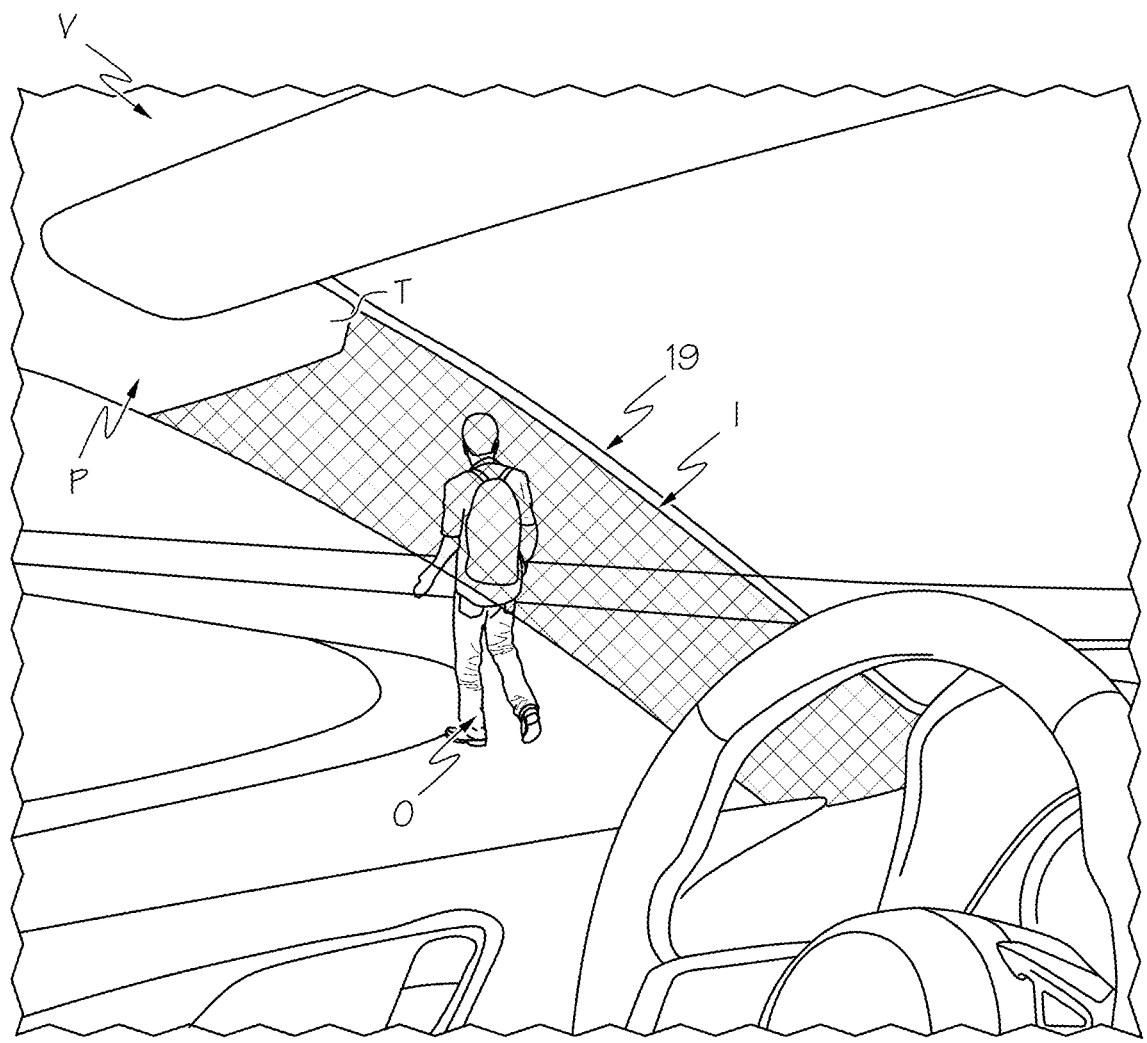
FIG. 12 schematically depicts a cloaking device cloaking a vehicle A-pillar of a vehicle according to one or more embodiments described and illustrated herein.

Referring to FIG. 12, embodiments of a pillar of a vehicle being cloaked by a tilted cloaking device are shown. Particularly, FIG. 12 shows a tilted cloaking device 19 as described herein cloaking a portion of a pillar P of a vehicle V. In some embodiments, the pillar P is an A-pillar. In other embodiments, the pillar P is a B-pillar. In still other embodiments, the pillar P is a C-pillar. A portion of the pillar P is positioned within a tilted cloaked region (not shown) of the tilted cloaking device 19 and a portion of the pillar P extends beyond the cloaking device and is covered with trim T. Illustrated outside of the vehicle V on the object-side of the tilted cloaking device 19 is a target object 'O' in the form of pedestrian. A portion of the pedestrian O is visible through a side window of the vehicle V and a portion of the pedestrian is visible "through" the pillar P cloaked by the tilted cloaking device 19. The tilted cloaking device 19 redirects light reflected from the pedestrian O around the pillar P positioned within the cloaked region of the tilted cloaking device 19 and forms an image I of the pedestrian O in the interior of the vehicle on the image-side of the tilted cloaking device 19 that is visible to an occupant of the vehicle V looking towards the pedestrian O. Accordingly, light from the pedestrian O appears to pass through the pillar P and a blind spot typically created by the pillar P is not as present as when the portion of the pillar P is not positioned within the cloaked region of the tilted cloaking device 19. In embodiments, the pillar P itself serves as the cloaked region, i.e. the pillar P has an outer surface with one or more inward facing surfaces that assist in redirecting light from the pedestrian) around the pillar P. It should be appreciated that cloaking of the pillar P with the tilted cloaking device 19 and bypassing the blind spot produced by the pillar P is performed without the use of metamaterials, video images, cameras, sophisticated electronics, etc.

EXAMPLES

Figure 13A:
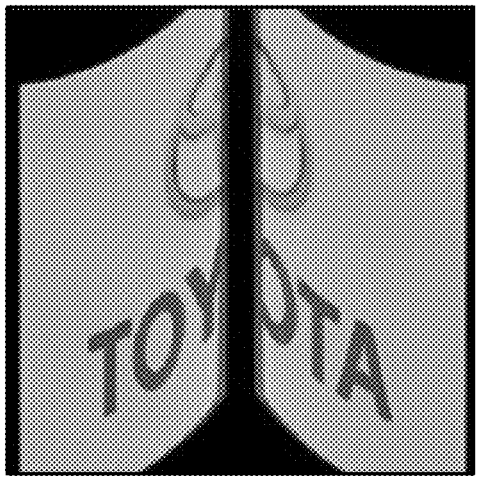
FIG. 13A depicts a computer simulated cloaking image for a cloaking device assembly according to FIGS. 5 and 6 without tilt correction and tilted at an angle of 30° relative to a zero-tilt axis.
Figure 13B:
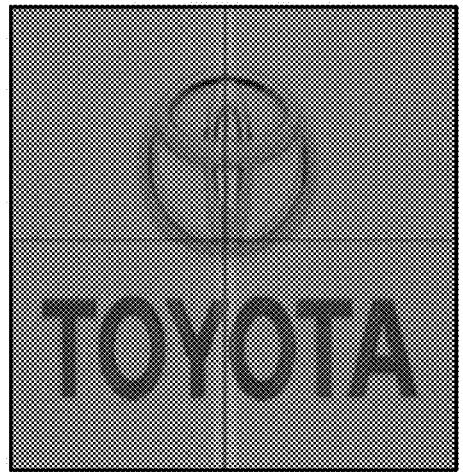
FIG. 13B depicts a computer simulated cloaking image for a cloaking assembly according to FIGS. 5 and 6 with tilt correction comprising two Fresnel prisms and tilted at an angle of 30° relative to a zero-tilt axis.
Figure 13C:
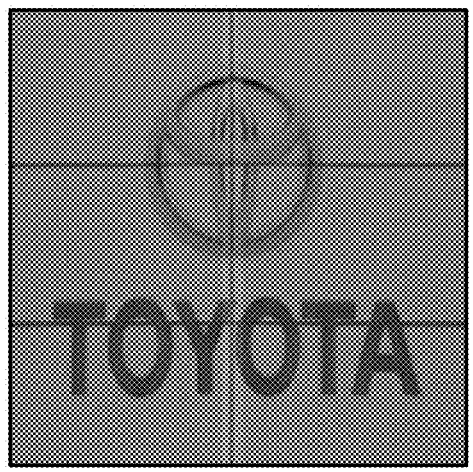
FIG. 13C depicts a computer simulated cloaking image for a cloaking assembly according to FIGS. 5 and 6 with tilt correction comprising three Fresnel prisms and tilted at an angle of 30° relative to a zero-tilt axis.
Figure 13D:
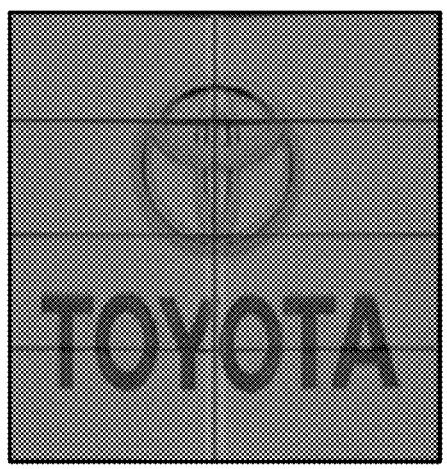
FIG. 13D depicts a computer simulated cloaking image for a cloaking assembly according to FIGS. 5 and 6 with tilt correction comprising four Fresnel prisms and tilted at an angle of 30° relative to a zero-tilt axis.

Referring now to FIGS. 13A-13D, images of an object positioned on the object-side 22 of the cloaking device assembly 20 and as viewed from the image-side 24 simulated using a commercial software program (Zemax OpticStudio) are depicted. The object-side half lenses 200, 240 and image-side half lenses 220, 260 were half lenses of commercial AYL5040-A acylindrical lenses from Thorlabs and the tilt axis 28 was oriented at an angle of 30° relative to the zero-tilt axis 27. FIG. 13A depicts an image of the object without tilt correction for the cloaking device assembly 20, i.e., without the object-side TC component 150 positioned on the object-side 22 and the image-side TC component 160 positioned on the image-side 24. FIG. 13B depicts an image of the object with the object-side TC component 150 having two Fresnel prisms 152 and the image-side TC component 160 having two Fresnel prisms 162. FIG. 13C depicts an image of the object with the object-side TC component 150 having three Fresnel prisms 152 and the image-side TC component 160 having three Fresnel prisms 162. FIG. 13D depicts an image of the object with the object-side TC component 150 having four Fresnel prisms 152 and the image-side TC component 160 having four Fresnel prisms 162. As shown by the images in FIGS. 13A-13D, an image of an object on the object-side 22 of the cloaking device assembly 20 is significantly distorted when the cloaking device assembly 20 is tilted 30° and the tilt correction (i.e., object-side TC component 150 and image-side TC component 160) is not included.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. The terms "object," "article," and "item" may interchangeably refer to a visual object or image (2D or 3D) that reflects light or transmits light and the term "light from" may refer to "light reflected from" or "light transmitted from." The terms "generally," may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It should be understood that cloaking devices described herein may be tilted relative to a zero-tilt axis extending generally parallel to the Z-axis and the object O depicted in the figures such that light from the object is incident on the cloaking devices at an acute angle. It should also be understood that tilt correction components described herein may be utilized to redirect light incident on the cloaking devices such that light propagates generally normal through the cloaking devices, and then is redirected again to generally parallel to light from the object incident on the cloaking devices.

Directional terms as used herein—for example top, upper, bottom, and lower—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
    an object-side, an image-side, a cloaked region (CR) between the object-side and the image-side, a zero-tilt axis and a tilt axis, wherein the zero-tilt axis extends generally parallel to an object positioned on the object-side and the tilt axis extends at an acute angle relative to the zero-tilt axis; and
    an object-side optical component positioned on the object-side and an image-side optical component positioned on the image-side, wherein an outward facing surface of the object-side optical component and an outward facing surface of the image-side optical component extend generally parallel to the tilt axis such that the object-side optical component and the image-side optical component are oriented relative to the zero-tilt axis at the acute angle;
    an object-side tilt correction (TC) component positioned on the object-side and an image-side TC component positioned on the image-side;
    wherein:
        light from the object on the object-side of the cloaking device propagating generally normal to the zero-tilt axis and incident on the object-side TC component is redirected generally normal to the tilt axis by the object-side TC component;
        light redirected by the object-side TC component propagates through the object-side optical component and the image-side optical component generally normal to the tilt axis; and
        light propagating through the image-side optical component generally normal to the tilt axis is redirected generally normal to the zero-tilt axis by the image-side TC component to form an image of the object on the image-side of the cloaking device,
    wherein:
        the object-side TC component is positioned between the object and the CR;
        the object-side optical component is positioned between the CR and the object-side TC component;
        the image-side TC component is positioned between the image and the CR; and
        the image-side optical component is positioned between the CR and the image-side TC component,
    wherein the object-side TC component and the image-side TC component each comprise an outward facing planar surface and at least one Fresnel prism comprising an outward facing first surface, a second surface, and an inward facing hypotenuse surface extending between the first surface and the second surface.

2. The cloaking device of claim 1, wherein the object-side TC component is positioned outwardly from the object-side optical component and the image-side TC component is positioned outwardly from the image-side optical component.

3. The cloaking device of claim 1, wherein light propagates through the cloaking device via an optical path of: object—object-side TC component—object-side optical component—image-side optical component—image-side TC component—image.

4. The cloaking device of claim 1, wherein the at least one Fresnel prism of the object-side TC component refracts light from the object incident on the object-side TC component generally normal to the tilt axis.

5. The cloaking device of claim 1, wherein the at least one Fresnel prism of the image-side TC component refracts light propagating through the image-side optical component generally normal to the zero-tilt axis.

6. The cloaking device of claim 1, wherein the zero-tilt axis is a vertical axis.

7. The cloaking device of claim 1, wherein light propagates through the cloaking device via an optical path of: object—outward facing first surface of object-side TC component—inward facing hypotenuse surface of object-side TC component—object-side optical component—image-side optical component—inward facing hypotenuse surface of image-side TC component—outward facing first surface of image-side TC component—image.

8. The cloaking device of claim 1, wherein the object-side optical component and the image-side optical component comprise at least one of a pair of prisms, a pair of planar mirrors, a pair of curved mirrors, a pair of half-mirrors, a pair of converging lenses and a pair of color filters.

9. A cloaking device assembly comprising:
an object-side, an image-side, a cloaked region (CR) between the object-side and the image-side, and a cloaked article positioned within the cloaked region;
a zero-tilt axis and a tilt axis, wherein the zero-tilt axis extends generally parallel to an object positioned on the object-side and the tilt axis extends at an acute angle relative to the zero-tilt axis;
an object-side optical component and an object-side tilt correction (TC) component positioned on the object-side of the cloaked region and oriented relative to the zero-tilt axis at the acute angle; and
an image-side optical component and an image-side TC component positioned on the image-side of the cloaked region and oriented relative to the zero-tilt axis at the acute angle;
wherein:
light from the object on the object-side of the cloaking device propagating generally normal to the zero-tilt axis and incident on the object-side TC component is redirected generally normal to the tilt axis by the object-side TC component;
light redirected by the object-side TC component propagates through the object-side optical component and the image-side optical component generally normal to the tilt axis; and
light propagating through the image-side optical component generally normal to the tilt axis is redirected generally normal to the zero-tilt axis by the image-side TC component to form an image of the object on the image-side of the cloaking device assembly,
wherein:
the object-side TC component is positioned between the object and the CR;
the object-side optical component is positioned between the CR and the object-side TC component;
the image-side TC component is positioned between the image and the CR; and
the image-side optical component is positioned between the CR and the image-side TC component,
wherein the object-side TC component and the image-side TC component each comprise an outward facing planar surface and at least one Fresnel prism comprising an outward facing first surface, a second surface, and an inward facing hypotenuse surface extending between the first surface and the second surface.

10. The cloaking device assembly of claim 9, wherein the object-side TC component is positioned outwardly from the object-side optical component and the image-side TC component is positioned outwardly from the image-side optical component.

11. The cloaking device assembly of claim 9, wherein:
the at least one Fresnel prism of the object-side TC component refracts light from the object incident on the object-side TC component generally normal to the tilt axis such that light propagates through the object-side optical component and the image-side optical component generally normal to the tilt axis; and
the at least one Fresnel prism of the image-side TC component refracts light propagating through the image-side optical component generally normal to the zero-tilt axis.

12. The cloaking device assembly of claim 9, wherein the zero-tilt axis is a vertical axis.

13. The cloaking device assembly of claim 9, wherein light propagates through the cloaking device assembly via an optical path of: object—outward facing first surface of object-side TC component—inward facing hypotenuse surface of object-side TC component—object-side optical component—image-side optical component—inward facing hypotenuse surface of image-side TC component—outward facing first surface of image-side TC component—image.

* * * * *

UNITED STATES PATENT AND TRADEMARK OFFICE
CERTIFICATE OF CORRECTION

| | | |
|---|---|---|
| PATENT NO. | : 11,370,358 B2 | Page 1 of 1 |
| APPLICATION NO. | : 15/959789 | |
| DATED | : June 28, 2022 | |
| INVENTOR(S) | : Kyu-Tae Lee, Songtao Wu and Debasish Banerjee | |

It is certified that error appears in the above-identified patent and that said Letters Patent is hereby corrected as shown below:

In the Specification

In Column 20, Line(s) 27, delete "36213" and insert --362 — --, therefor.

Signed and Sealed this
Twenty-eighth Day of February, 2023

Katherine Kelly Vidal
*Director of the United States Patent and Trademark Office*